(12) United States Patent  
Kohara

(10) Patent No.: US 10,907,692 B2  
(45) Date of Patent: Feb. 2, 2021

(54) BOOT ATTACHMENT METHOD AND CONSTANT VELOCITY UNIVERSAL JOINT

(71) Applicant: NTN CORPORATION, Osaka (JP)

(72) Inventor: Mika Kohara, Shizuoka (JP)

(73) Assignee: NTN CORPORATION, Osaka (JP)

( * ) Notice: Subject to any disclaimer, the term of this patent is extended or adjusted under 35 U.S.C. 154(b) by 437 days.

(21) Appl. No.: 15/560,218

(22) PCT Filed: Mar. 2, 2016

(86) PCT No.: PCT/JP2016/056428  
§ 371 (c)(1),  
(2) Date: Sep. 21, 2017

(87) PCT Pub. No.: WO2016/152420  
PCT Pub. Date: Sep. 29, 2016

(65) Prior Publication Data  
US 2018/0045251 A1 Feb. 15, 2018

(30) Foreign Application Priority Data

Mar. 26, 2015 (JP) ................................. 2015-064495  
Mar. 26, 2015 (JP) ................................. 2015-064506  
(Continued)

(51) Int. Cl.  
*F16D 3/84* (2006.01)  
*F16J 15/52* (2006.01)  
(Continued)

(52) U.S. Cl.  
CPC .............. *F16D 3/845* (2013.01); *B29C 65/32* (2013.01); *B29C 66/742* (2013.01); *F16D 3/84* (2013.01);  
(Continued)

(58) Field of Classification Search  
CPC . F16D 3/645; F16D 3/84; B29C 65/32; B29C 66/742; B29C 65/14; F16J 3/04;  
(Continued)

(56) References Cited

U.S. PATENT DOCUMENTS 1,813,591 A * 7/1931 Ulrey ...................... H01J 9/385  
    219/676  
3,528,867 A * 9/1970 Heller, Jr. ......... B29C 66/81871  
    156/272.4  
(Continued)

FOREIGN PATENT DOCUMENTS

JP    57088987 A * 6/1982  
JP    02-087495    3/1990  
(Continued)

OTHER PUBLICATIONS

Machine translation of JP200133437A, Ueda et al. 22 pages total (Year: 2001).*  
(Continued)

*Primary Examiner* — Jeffry H Aftergut  
*Assistant Examiner* — Jaeyun Lee  
(74) *Attorney, Agent, or Firm* — Wenderoth, Lind & Ponack, L.L.P.

(57) ABSTRACT

Provided is a boot mounting method for a constant velocity universal joint in which a boot end portion is mounted and fixed to a mating member made of metal. After the boot end portion is fitted over a receiving surface being a radially outer surface of the mating member, a high-frequency induction heating coil having a ring shape is fitted over the boot end portion. Only a top portion of the receiving surface of the mating member is heated by high-frequency induction through application of a high-frequency current to the high-frequency induction heating coil. With this action, a mounting surface being a radially inner surface of the boot end (Continued)

portion and the receiving surface being the radially outer surface of the mating member are integrally joined to each other.

16 Claims, 28 Drawing Sheets

(30) Foreign Application Priority Data

Mar. 26, 2015 (JP) ................................ 2015-064517
Mar. 26, 2015 (JP) ................................ 2015-064520

(51) Int. Cl.
*F16J 3/04* (2006.01)
*B29C 65/32* (2006.01)
*B29C 65/00* (2006.01)
*B29K 667/00* (2006.01)

(52) U.S. Cl.
CPC ................. *F16J 3/04* (2013.01); *F16J 3/042* (2013.01); *F16J 15/52* (2013.01); *B29K 2667/00* (2013.01); *F16D 2250/0084* (2013.01)

(58) Field of Classification Search
CPC ........ F16J 3/042; F16J 15/52; H01L 21/0231; H01L 21/268
See application file for complete search history.

(56) References Cited

U.S. PATENT DOCUMENTS 5,810,958 A * 9/1998 Ragno ................. B29C 66/1122
156/272.4

8,272,116 B2 * 9/2012 Nakagawa ............ F16D 3/2237
29/419.2

2010/0130294 A1    5/2010 Nakagawa

FOREIGN PATENT DOCUMENTS

| JP | 2-168024 | | 6/1990 |
| JP | 10-069968 | | 3/1998 |
| JP | 2001334371 A | * | 12/2001 |
| JP | 2004-510113 | | 4/2004 |
| JP | 2009-052688 | | 3/2009 |
| JP | 2009-185879 | | 8/2009 |
| JP | 2011-144850 | | 7/2011 |
| JP | 2011-252594 | | 12/2011 |
| JP | 2013234733 A | * | 11/2013 |
| WO | 2009/016813 | | 2/2009 |

OTHER PUBLICATIONS

Machine translation of JP2013234733A, Takane et al. 20 pages total (Year: 2013).*

Translation of JP57088987A "production of small diameter pipe" detailed description (Year: 1982).*

International Search Report dated May 24, 2016 in International (PCT) Application No. PCT/JP2016/056428.

International Preliminary Report on Patentability and Written Opinion of the International Searching Authority dated Sep. 26, 2017 in International (PCT) Application No. PCT/JP2016/056428.

* cited by examiner

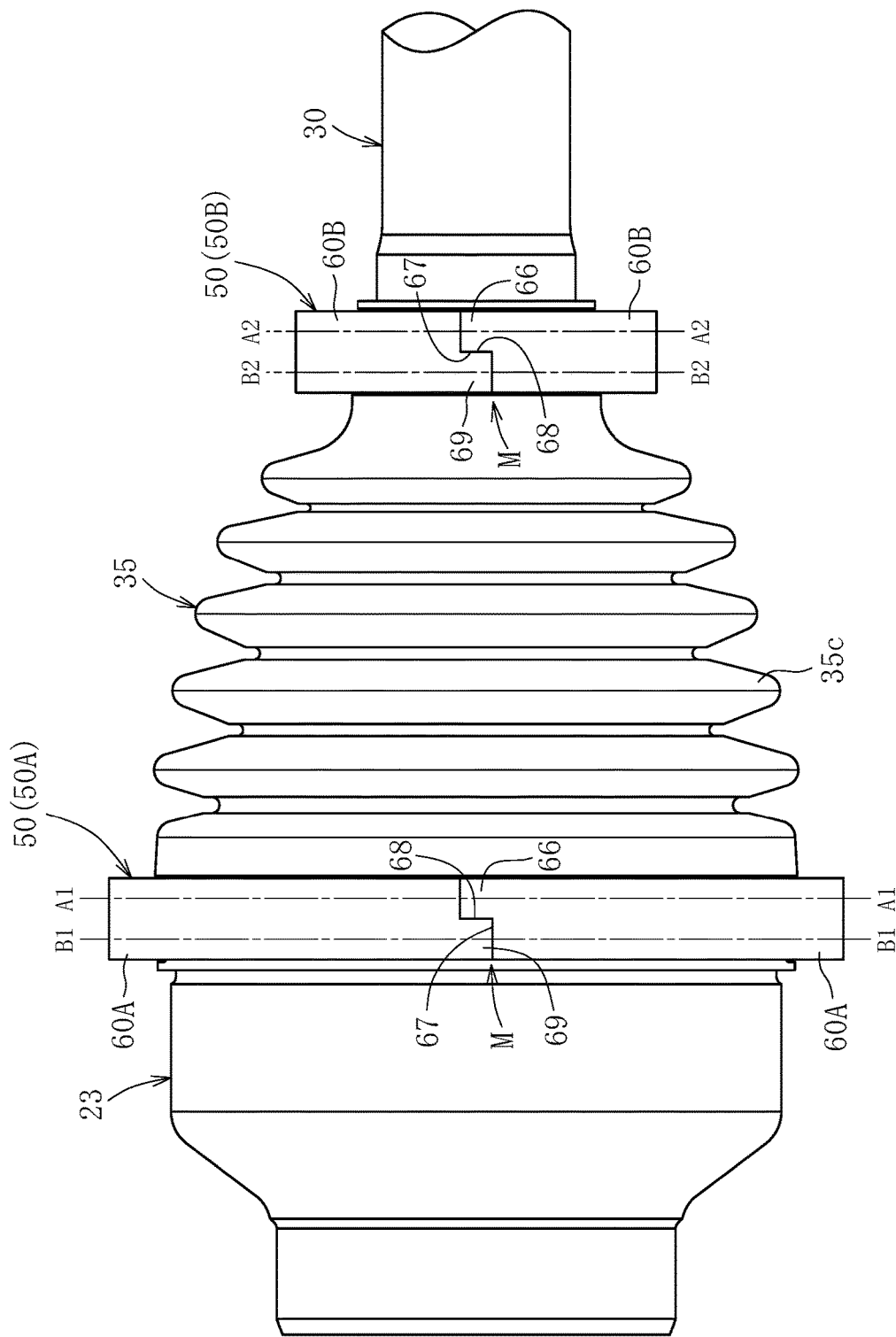

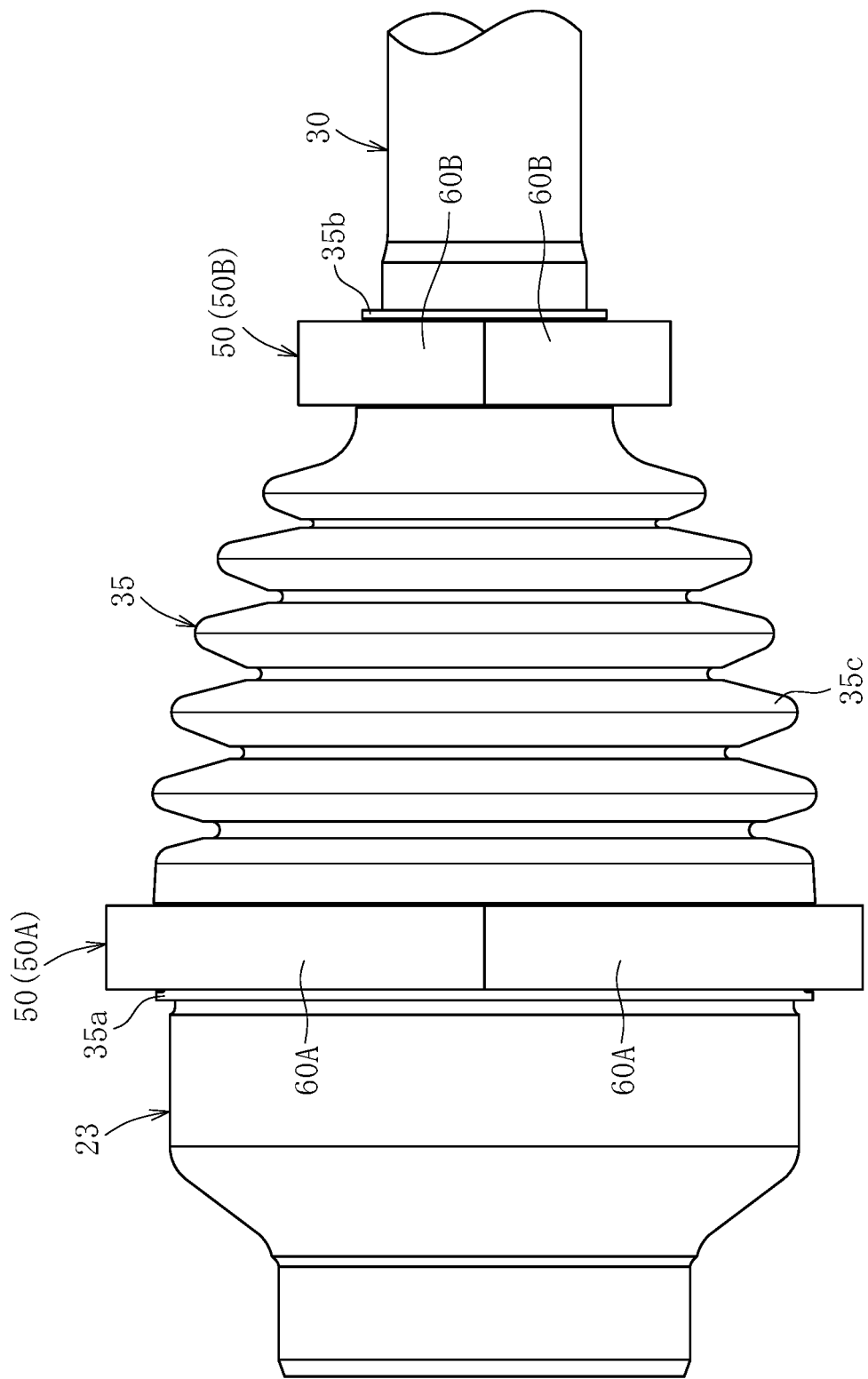

BOOT ATTACHMENT METHOD AND CONSTANT VELOCITY UNIVERSAL JOINT

TECHNICAL FIELD

The present invention relates to a boot mounting method for a constant velocity universal joint, and to a constant velocity universal joint which is constructed using the boot mounting method.

BACKGROUND ART

For a constant velocity universal joint which is to be assembled to, for example, a power transmission mechanism of automobiles and various industrial machines, a boot (boot for a constant velocity universal joint) is mounted for the purpose of preventing entry of foreign matters such as dust into the joint and preventing leakage of grease sealed in the joint.

As illustrated in FIG. 28, a constant velocity universal joint (fixed type constant velocity universal joint) includes an outer joint member 3, an inner joint member 6, a plurality of balls 7, and a cage 8. The outer joint member 3 has a plurality of track grooves 1, which are formed in a radially inner surface 2 and extend in an axial direction. The inner joint member 6 has a plurality of track grooves 4, which are formed in a radially outer surface 5 at equal intervals along a circumferential direction and extend in the axial direction. The plurality of balls 7 are interposed between the track grooves 1 of the outer joint member 3 and the track grooves 4 of the inner joint member 6 and are configured to transmit torque. The cage 8 is interposed between the radially inner surface 2 of the outer joint member 3 and the radially outer surface 5 of the inner joint member 6 and is configured to retain the balls 7.

A female spline 9 is formed along an inner periphery of an axial center hole of the inner joint member 6, and an end portion male spline 11 of a shaft 10 is fitted into the axial center hole of the inner joint member 6 so that the female spline 9 and the end portion male spline 11 are fitted to each other. Further, the end portion male spline 11 of the shaft 10 has a circumferential groove 12. A stop ring 13 serving as a stopper is mounted to the circumferential groove 12.

An opening portion of the outer joint member 3 is sealed with a boot 15. The boot 15 includes a large-diameter mounting portion 15a, a small-diameter mounting portion 15b, and a bellows portion 15c connecting the large-diameter mounting portion 15a and the small-diameter mounting portion 15b to each other. The large-diameter mounting portion 15a of the boot 15 is fastened and fixed by a fastening band 16 at an opening end of the outer joint member 3, and the small-diameter mounting portion of the boot 15 is fastened and fixed by a fastening band 17 at a predetermined portion of the shaft 10.

There has been known a lever type boot band (Patent Literature 1) as such a fastening band. Specifically, the lever type boot band includes a band main body and a lever. The band main body is formed on a ring portion. The lever is provided to a joined portion of the band main body. The lever is folded back so that an inner surface of the lever overlaps a radially outer surface of the band main body.

Further, as the fastening band, there has been known a fastening band using an engagement claw and an engagement hole (Patent Literature 2). According to the fastening band disclosed in Patent Literature 2, an ear portion protruding radially outward is formed, and the ear portion is compressed to reduce a diameter of a ring portion.

However, when such a band is used, it is necessary to use the band as a separate component, and the number of components is increased. As a result, manufacture cost required for assembly of the constant velocity universal joint is increased. Further, under a state in which the band is mounted, it is necessary to highly accurately fasten the band with a predetermined interference in order to secure sealability. However, there is difficulty in achieving highly accurate fastening while dealing with variation in individuals.

Therefore, there have hitherto been proposed methods of mounting and fixing a boot end portion to a mating member using high-frequency induction (Patent Literature 3) or laser light (Patent Literature 4) without use of the fastening band (boot band).

According to the method using the high-frequency induction, under a state in which a boot end portion is fitted over a receiving surface of a mating member, a high-frequency induction heating coil is arranged on an outer peripheral portion of the boot end portion, and a high-frequency current is applied to the high-frequency induction heating coil. Specifically, the receiving surface of the mating member having conductivity is heated by high-frequency waves through the boot end portion, with the result that the boot end portion and the receiving surface of the mating member are joined and integrated to each other by the heat.

Further, according to the method using the laser light, a metal material and a resin material are joined to each other by a physical interaction caused by irradiation of laser light from a resin material surface side.

CITATION LIST

Patent Literature 1: JP 2011-252594 A
Patent Literature 2: JP 2004-510113 A
Patent Literature 3: JP 2009-52688 A
Patent Literature 4: JP 2009-185879 A

SUMMARY OF INVENTION

Technical Problem

With the method using the high-frequency induction, as compared to the related-art fastening method using the band, there are advantages in that the number of components can be reduced and that assembly of the constant velocity universal joint can be simplified. Incidentally, the electromagnetic induction heating with high-frequency waves is generally used in, for example, heat treatment for metal. This heating method involves self-heating through use of an induced current generated in a heated object. Therefore, only a material having conductivity can be heated, and a non-conductive material is not heated.

At the time of heating, a clearance (gap) needs to be formed between the coil and the heated object. This is because the coil is damaged when the coil that is electrified is brought into contact with the heated object. Further, rapid heating and surface heating can be performed through use of the high-frequency induction, and a heating temperature is changed in accordance with an oscillation frequency, a current, and a distance (gap amount) between the coil and the heated object.

Therefore, in order to mount and fix the boot by the high-frequency induction heating, it is necessary to arrange the high-frequency induction heating coil so as to be coaxial with a shaft or an outer joint member. Specifically, this is because, when the gap amount between the coil and the shaft or between the coil and the outer joint member is not uniform in any phase in the circumferential direction, surface temperatures in respective phases may vary, with the result that the joining strength may also vary. However, there is difficulty in arranging the coil so as to be coaxial with the shaft or the outer joint member with high accuracy, and there is a fear in that a uniform gap amount cannot be set.

Further, the electromagnetic induction heating often causes the rise in temperature of the coil itself by transferred heat or radiant heat from the heated object. Therefore, when the electromagnetic induction heating is used in heat treatment for metal, the coil is also cooled together with the heated object by a coolant or the like, with the result that accumulation of heat in the coil due to the transferred heat or the radiant heat from the heated object is cancelled.

However, when a boot is mounted to a constant velocity universal joint, a heated object (outer joint member or shaft) and a coil are not cooled. Therefore, there is a fear in that a stable output of the coil is less likely to be obtained or that the lifetime of the coil is shortened.

Further, the method using the laser light requires a laser irradiation device, and it is necessary to irradiate the laser light to an irradiated portion over an entire periphery in a circumferential direction and over an entire length in an axial direction. Therefore, the device is complicated, with the result that the cost is increased.

Further, when the high-frequency induction heating coil is used, it is preferred that a separated structure be employed in consideration of simplification of assembly steps.

However, when the separated structure is employed, a mating surface is formed on the coil. When such a mating surface is formed, there is a fear in that a non-adhering portion or a portion having a smaller joining strength is formed in the joined portion corresponding to the mating surface.

Incidentally, the fixing of the boot requires a joining strength, which can tolerate generation of a rotary force caused by a differential motion in a case of expansion and contraction of the boot or a contact with the bellows, and a function of preventing leakage from the boot. Therefore, consideration is made of the case where the non-adhering portion or the like is formed in the joined portion corresponding to the mating portion of the coil. The joining strength can be compensated through increase in a joining area. Meanwhile, with regard to the leakage of grease, the leakage of grease is more liable to occur when there is any phase in which the boot is not joined in the circumferential direction.

Further, when the constant velocity universal joint is rotated in a state of taking an operating angle, a relatively large force is received at a joined portion between the boot and the outer joint member and at a joined portion between the shaft and the boot. Therefore, in the joining method for a boot through use of the electromagnetic induction heating, it is necessary to obtain a large joining strength at those joined portions.

However, the receiving surface being the radially outer surface of the mating member is a cylindrical surface, and hence the method using the high-frequency induction cannot achieve an effect of causing an adhesive to enter a hole or a cleavage of a material surface and be hardened thereat (anchor effect). Therefore, there is difficulty in obtaining a large joining strength.

Accordingly, a first object of the present invention is to provide a boot mounting method which is capable of achieving a uniform adhesive strength (joining strength) in a circumferential direction and obtaining a stable joining strength, and to provide a constant velocity universal joint using the boot mounting method. A second object of the present invention is to provide a boot mounting method which prevents loss of sealability even when joining is performed under a state in which employment of a separable coil causes a gap formed between mating surfaces of the separable coil and in which portions corresponding to the joining surfaces are in non-contact state, and to provide a constant velocity universal joint using the boot mounting method. A third object of the present invention is to provide a boot mounting method which is capable of achieving a uniform adhesive strength (joining strength) in the circumferential direction to obtain a stable joining strength, achieving longer lifetime of the high-frequency induction heating coil which is to be used, and obtaining a stable output, and to provide a constant velocity universal joint by the boot mounting method. A fourth object of the present invention is to provide a boot mounting method which is capable of obtaining a stable and large joining strength, and to provide a constant velocity universal joint by the boot mounting method.

Solution to Problem

There is provided a boot mounting method for a constant velocity universal joint in which a boot end portion is mounted and fixed to a mating member made of metal, the boot mounting method comprising: fitting the boot end portion over a receiving surface being a radially outer surface of the mating member; fitting a high-frequency induction heating coil having a ring shape over the boot end portion; and heating only a top portion of the receiving surface of the mating member by high-frequency induction through application of a high-frequency current to the high-frequency induction heating coil so that a mounting surface being a radially inner surface of the boot end portion and the receiving surface being the radially outer surface of the mating member are integrally joined to each other.

With the boot mounting method according to the present invention, when a high-frequency current is applied to the high-frequency induction heating coil, the electromagnetic induction causes the mating member made of metal being a conductive member to generate heat through core loss (sum of eddy current loss and hysteresis loss). The heat causes a boundary portion of the boot end portion in contact with the mating member to be rapidly heated to a temperature equal to or higher than a decomposition temperature, and then the boundary portion of the boot end portion is decomposed, thereby generating bubbles. With this action, high-temperature and high-pressure conditions are given to the high-temperature melt in the periphery of the above-mentioned bubbles and to the surface of the mating member. As a result, the joined portion is obtained between the mounting surface of the boot end portion and the receiving surface of the mating member. With this action, the boot end portion is mounted and fixed to the mating member made of metal.

With this method, the boot end portion is present (interposed) between the high-frequency induction heating coil and the heated object (mating member). The boot material is resin, which is a non-conductive material. Therefore, even when the high-frequency induction heating coil and the boot end portion are brought into contact with each other, the high-frequency induction heating coil is prevented from being broken. Further, the thickness of the boot end portion is generally constant. Therefore, when the high-frequency induction heating coil is brought into contact with a radially outer portion (non-adhering surface) of the mounting surface of the boot end portion, a gap formed between the mating member being the heated object and the high-frequency induction heating coil can be maintained accurately in the circumferential direction.

Further, the high-frequency induction heating coil having the ring shape may be fitted over the boot end portion under a state in which a heat-insulating material is interposed between an inner peripheral surface of the high-frequency induction heating coil and the boot end portion. When the heat-insulating material is interposed as described above, the heat-insulating material and the boot end portion are present (interposed) between the high-frequency induction heating coil and the heated object (mating member), thereby being capable of suppressing transfer of heat to the coil. Further, the boot material is resin, which is a non-conductive material. Therefore, even when the high-frequency induction heating coil is brought into contact with the boot end portion through intermediation of the heat-insulating material, the high-frequency induction heating coil is prevented from being broken. Further, the thickness of the boot end portion is generally constant. Therefore, when the high-frequency induction heating coil is brought into contact with the radially outer portion (non-adhering surface) of the mounting surface of the boot end portion, a gap formed between the mating member being the heated object and the high-frequency induction heating coil can be maintained accurately in the circumferential direction.

It is preferred that heating be performed by high-frequency induction under the state in which the non-mounting surface being the radially outer surface of the boot end portion and the radially inner surface of the heat-insulating material are held in contact with each other and in which the radially outer surface of the heat-insulating material and the radially inner surface of the high-frequency induction heating coil are held in contact with each other. Through such a contact, a gap between the high-frequency induction heating coil and the mated member can be set uniform over an entire periphery in the circumferential direction.

The heat-insulating material may be a general heat-insulating material such as ceramics, glass wool, ceramics fiber, cement plate, or silicone rubber. However, it is preferred that the heat-insulating material be made of an inorganic compound (inorganic material) such as ceramics or glass wool having high heat resistance.

A slit may be formed in the receiving surface being the radially outer surface of the mating member, and after the boot end portion is fitted over the receiving surface of the mating member, the high-frequency induction heating coil having the ring shape may be fitted over the boot end portion.

As described above, when the slit is formed in the receiving surface being the radially outer surface of the mating member, the boot material melted by the high-frequency induction enters the slit. That is, the boot material enters a space formed in the receiving surface and is hardened therein, thereby achieving the anchor effect. Further, through formation of the slit in the receiving surface being a cylindrical surface, an edge portion is formed. The proximity effect of the electromagnetic induction causes the edge portion of the slit to be more likely to raise its temperature, and a desired temperature can be obtained over a wide range of the coil contact surface (boot joining surface).

The slit formed in the receiving surface of the mating member may have a depth set within a range of from 0.1 mm to 1 mm. When the depth of the slit is more than 1 mm, the slit is excessively deep, with the result that the strength of the mating member (outer joint member or shaft) is degraded. Further, the electromagnetic induction is performed at high frequency for a short period of time. Therefore, there is a fear in that heating is less likely to be performed. In contrast, when the depth of the slit is less than 0.1 mm, the anchor effect of causing the boot material to enter the space formed in the receiving surface and be hardened therein is less likely to be achieved, and the proximity effect by the electromagnetic induction is less likely to be obtained.

It is preferred that the high-frequency induction heating coil comprise a dividable ring member comprising two arcuate members combined with each other, and that a contact between the radially inner surface of the high-frequency induction heating coil and the radially outer surface being the non-mounting surface of the boot end portion have an interference. Even a small interference in the boot may stabilize the gap amount of the joined portion in the circumferential direction. Further, when the interference is excessively large, the coil cannot be fully closed, with the result that the function cannot be achieved, that is, the high-frequency induction heating coil cannot be constructed. Therefore, in this case, it is preferred that an interference of from 0.05 mm to 0.3 mm be set.

Further, when the high-frequency induction heating coil is a dividable ring member, a small gap is formed between mating surfaces. Therefore, there is a fear in that the joined portions corresponding to the mating surfaces become non-joined portions with respect to the boot and the mating member or become a portion having a small joining strength. Therefore, each mating surface of the high-frequency induction heating coil has a stepped structure, and the non-joined portion or the portion having a small joining strength has a so-called labyrinth structure.

The stepped structure may comprise: a protruding portion formed on the mating surface of one of the arcuate members; and a recessed portion, which is formed in the mating surface of another of the arcuate members and receives the protruding portion fitted to the recessed portion.

In particular, it is preferred that a diameter (inner diameter) of the mounting surface of the boot end portion and a diameter (outer diameter) of the receiving surface of the mating member have an interference corresponding to a ratio of from 0.995 to 0.98. When the diameter ratio between the mounting surface of the boot end portion and the receiving surface of the mating member is less than 0.995 (smaller interference), a microscopic contact between the metal and the boot material is poor. When the interference is larger than 0.98 (larger interference), the press-fit resistance of the boot is large, with the result that there is a fear in that assembly is hindered.

The high-frequency induction heating coil may comprise a non-dividable ring member, and the radially inner surface of the high-frequency induction heating coil and the radially outer surface being the non-mounting surface of the boot end portion each may have a tapered surface reduced in diameter from a boot bellows portion side toward a boot end portion side. With such setting, the side of the high-frequency induction heating coil, which is larger in diameter, can be fitted into the boot end portion from a small-diameter side of the boot end portion.

The tapered surface may have a taper angle of from 5° to 30°. This is based on the moldability of the boot. When the taper angle is less than 5°, the ease of fitting is degraded. When the taper angle is more than 30°, a gap of the coil with respect to the heated portion significantly differs at an axial end portion. Therefore, there is a fear in that the surface temperature of the mating member may vary.

It is preferred that the boot material be thermoplastic polyester-based elastomer. The thermoplastic polyester-based elastomer is excellent in mechanical strength, moldability, and elasticity, and hence is preferred as a material providing functions such as bending resistance required for the boot.

According to one embodiment of the present invention, there is provided a first constant velocity universal joint, comprising: an outer joint member; an inner joint member; and a torque transmission member interposed between the outer joint member and the inner joint member, the outer joint member having an opening portion sealed with a boot, the boot comprising: a large-diameter mounting portion mounted to a boot receiving portion formed in a radially outer surface on the opening portion side of the outer joint member; a small-diameter mounting portion mounted to a boot receiving portion of a shaft fitted into the inner joint member; and a bent portion connecting the large-diameter mounting portion and the small-diameter mounting portion, the large-diameter mounting portion of the boot being the boot end portion, the boot receiving portion formed in the radially outer surface of the outer joint member on the opening portion side being the receiving surface of the mating member, the large-diameter mounting portion of the boot and the boot receiving portion of the outer joint member being integrally joined to each other through use of the boot mounting method.

According to one embodiment of the present invention, there is provided a second constant velocity universal joint, comprising: an outer joint member; an inner joint member; and a torque transmission member interposed between the outer joint member and the inner joint member, the outer joint member having the opening portion sealed with a boot, the boot comprising: a large-diameter mounting portion mounted to a boot receiving portion formed in a radially outer surface on an opening portion side of the outer joint member; a small-diameter mounting portion mounted to a boot receiving portion of a shaft fitted into the inner joint member; and a bent portion connecting the large-diameter mounting portion and the small-diameter mounting portion, the small-diameter mounting portion of the boot being the boot end portion, the boot receiving portion of the shaft being the receiving surface of the mating member, the small-diameter mounting portion of the boot and the boot receiving portion of the shaft being integrally joined to each other through use of the boot mounting method.

Advantageous Effects of Invention

According to the present invention, a gap formed between the mating member being the heated object and the high-frequency induction heating coil can be maintained accurately in the circumferential direction. Therefore, the adhesive strength (joining strength) in the circumferential direction is uniform, thereby achieving the stable joining strength. Further, relative movement between the mating member and the high-frequency induction heating coil is not required. Therefore, is possible to reduce the size and weight of the high-frequency induction heating device which comprises the high-frequency induction heating coil, thus contributing to reduction in cost.

When the heat-insulating material is interposed, the heat-insulating material and the boot end portion are present (interposed) between the high-frequency induction heating coil and the heated object (mating member), thereby being capable of suppressing transfer of heat to the coil. Therefore, there are advantages in that the stable output and joining strength can be obtained even during continuous use and that longer lifetime of the coil can be achieved. Further, adhesion of the boot material and the coil caused by the rise in temperature of the coil can be prevented, thereby being excellent in operability.

A gap formed between the mating member being the heated object and the high-frequency induction heating coil can be maintained accurately in the circumferential direction. Therefore, the adhesive strength (joining strength) in the circumferential direction is uniform, thereby achieving the stable joining strength. Further, relative movement between the mating member and the high-frequency induction heating coil is not required. Therefore, is possible to reduce the size and weight of the high-frequency induction heating device which comprises the high-frequency induction heating coil, thus contributing to reduction in cost.

When the inorganic material (inorganic compound) is used as the heat-insulating material, excellent heat resistance and durability can be achieved.

When the slit is formed in the receiving surface being the radially outer surface of the mating member, the joining strength between the boot end portion and the mating member is increased by the anchor effect and the proximity effect of the electromagnetic induction. Therefore, the stable joining strength is achieved between the boot end portion and the mating member, thereby being capable of achieving highly accurate sealing performance during rotation under the state in which the constant velocity universal joint takes the operating angle. Further, relative movement between the mating member and the high-frequency induction heating coil is not required. Therefore, is possible to reduce the size and weight of the high-frequency induction heating device which comprises the high-frequency induction heating coil, thus contributing to reduction in cost.

When the mating portion of the coil, which is liable to cause non-joining or weakening of the joining strength, has the so-called labyrinth structure, even when the non-joining or the portion having a small joining strength is given, the labyrinth structure achieves the function of preventing entry of foreign matters such as dust into the joint or preventing leakage of grease sealed in the joint.

The stepped structure may have a protruding portion and a recessed portion to which the protruding portion is fitted, thereby being capable of forming the stepped structure with a simple configuration.

When the mounting surface of the boot end portion and the receiving surface of the mating member have an interference, or when the contact between the radially inner surface of the coil and the radially outer surface being the non-mounting surface of the boot end portion have an interference, the degree of close contact between the boot end portion and the mating member is enhanced, thereby being capable of improving the reliability of the joining.

When the radially inner surface of the high-frequency induction heating coil and the radially outer surface being the non-mounting surface of the boot end portion each have a tapered surface, the ease of mounting of the coil can be improved, and the coil can be press-fitted so that the contact strength between the coil and the boot end portion is increased, thereby being capable of obtaining more stable joining strength.

When the thermoplastic polyester-based elastomer is used as the boot material, thermal deformation is less liable to occur, and the heat-resistant temperature is high. Therefore, when this material is used for the boot which is exposed to a high temperature, for example, during operation of the constant velocity universal joint, the degradation of the durability of the boot due to the high temperature can be prevented. In particular, thermoplastic polyester-based elastomer has a decomposition temperature of from about 400° C. to about 500° C., which is a temperature range being likely to be obtained through the electromagnetic induction heating. Therefore, the thermoplastic polyester-based elastomer is most suitable for use as the boot material in the boot mounting method.

With the constant velocity universal joint using the above-mentioned boot mounting method, the boot can be joined with the stable joining strength, thereby achieving excellent sealability for a long period of time.

BRIEF DESCRIPTION OF DRAWINGS

FIG. 7 is a side view for illustrating a state in which the boot is mounted through use of third high-frequency induction heating coils of the separable type.

FIG. 25 is a side view for illustrating the second constant velocity universal joint under a state in which the boot is mounted through use of the seventh high-frequency induction heating coils of the separable type.

DESCRIPTION OF EMBODIMENTS

Figure 1:
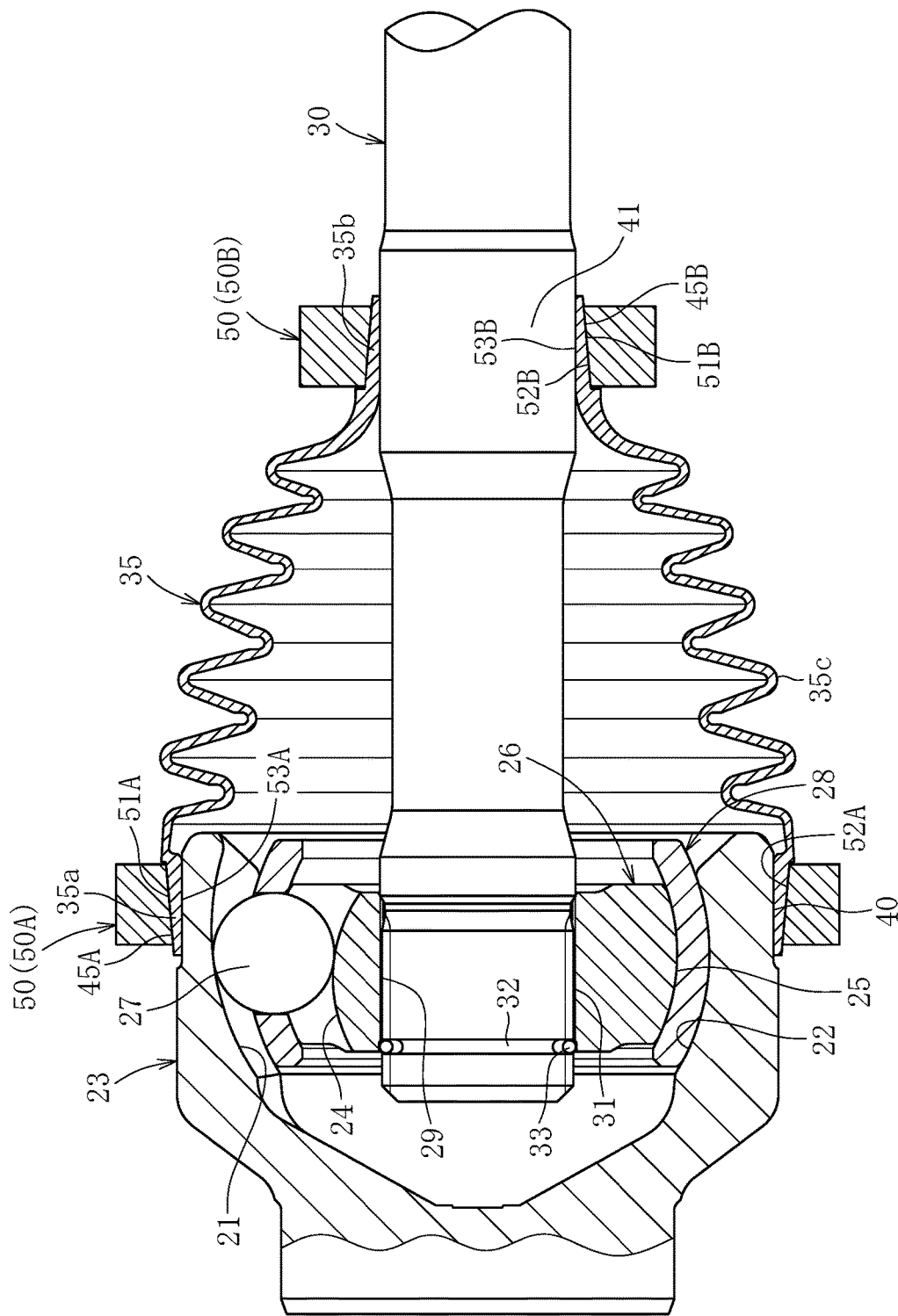
FIG. 1 is a sectional view for illustrating a first constant velocity universal joint according to the present invention under a state in which a boot is mounted.

Description is made of embodiments of the present invention with reference to FIG. 1 to FIG. 27. FIG. 3 is an illustration of a constant velocity universal joint (fixed type constant velocity universal joint of a Barfield-type) according to the present invention. The constant velocity universal joint comprises an outer joint member 23, an inner joint member 26, a plurality of balls 27, and a cage 28. The outer joint member 23 has a plurality of track grooves 21, which are formed in a radially inner surface 22 at equal intervals along a circumferential direction of the outer joint member 23 and extend in an axial direction of the outer joint member 23. The inner joint member 26 has a plurality of track grooves 24, which are formed in a radially outer surface 25 of the inner joint member 26 at equal intervals along the circumferential direction and extend in the axial direction. The plurality of balls 27 are interposed between the track grooves 21 of the outer joint member 23 and the track grooves 24 of the inner joint member 26 and serve as torque transmission members configured to transmit torque. The cage 28 is interposed between the radially inner surface 22 of the outer joint member 23 and the radially outer surface 25 of the inner joint member 26 and is configured to retain the balls 27.

A female spline 29 is formed along an inner periphery of an axial center hole of the inner joint member 26, and an end portion male spline 31 of a shaft 30 is fitted into the axial center hole of the inner joint member 26 so that the female spline 29 and the end portion male spline 31 are fitted to each other. Further, the end portion male spline 31 of the shaft 30 has a circumferential groove 32. A stop ring 33 serving as a stopper is mounted to the circumferential groove 32.

An opening portion of the outer joint member 23 is sealed with a boot 35. The boot 35 comprises a large-diameter mounting portion (boot end portion) 35a, a small-diameter mounting portion (boot end portion) 35b, and a bellows portion 35c being a bent portion connecting the large-diameter mounting portion 35a and the small-diameter mounting portion 35b to each other. The boot material is a resin material mainly containing, for example, polyester-based, silicone-based, polyurethane-based, polyolefin-based, polyamide-based, polystyrene-based, vinyl-chloride-based, or fluorine-based thermoplastic elastomer. In this embodiment, the boot material is a resin material mainly containing the polyester-based thermoplastic elastomer (thermoplastic polyester elastomer) being excellent in characteristics such as mechanical strength, heat resistance, oil resistance, and the like with respect to cost.

The large-diameter mounting portion (one boot end portion) 35a of the boot 35 is mounted and fixed to a receiving surface (receiving surface of a mating member made of metal) 40 of a radially outer surface of the outer joint member 23 on an opening side, and the small-diameter mounting portion (another boot end portion) 35b is mounted and fixed to a radially outer surface (receiving surface of a mating member made of metal) 41 of a large-diameter portion of the shaft 30.

For those mounting and fixing, as illustrated in FIG. 1 and FIG. 2, first high-frequency induction heating coils 50 (50A and 50B) are used. In this case, radially outer surfaces 45A and 45B being non-mounting surfaces of the boot end portions 35a and 35b are tapered surfaces 51A and 51B each reduced in diameter from the boot bellows portion side toward the boot end portion side, that is, tapered surfaces each reduced in diameter from the boot inner side toward the boot outer side. The tapered surfaces 51A and 51B each have an inclination angle $\theta$ set to from about 5° to about 30°.

Further, the high-frequency induction heating coils 50 (50A and 50B) are ring members, and radially inner surfaces 50Aa and 50Ba of the high-frequency induction heating coils 50 are tapered surfaces 52A and 52B each reduced in diameter from the boot bellows portion side toward the boot end portion side. The tapered surfaces 52A and 52B each have an inclination angle $\theta 1$ set to from about 5° to about 30°. The high-frequency induction heating coils 50A and 50B are each formed of copper wires or the like having conductivity and may be solid members or hollow members. When the high-frequency induction heating coils 50A and 50B are the hollow members, coolant water can pass therein. When the high-frequency induction heating coils 50A and 50B are the solid members, separate cooling jackets may be provided to the high-frequency induction heating coils 50A and 50B.

Figure 2A:
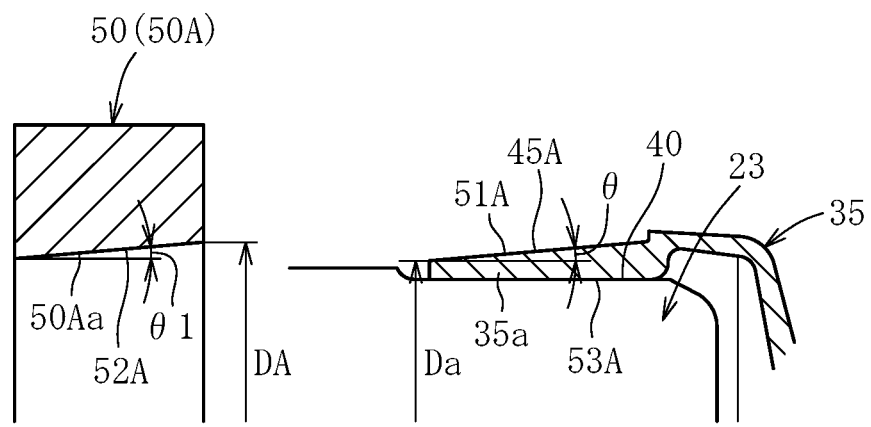
FIG. 2A is an illustration of a mounting method for a first high-frequency induction heating coil and is an enlarged sectional view of an outer joint member side.

Next, description is made of a boot mounting method using the high-frequency induction heating coils 50 (50A and 50B) illustrated in FIG. 1 and FIG. 2. First, description is made of the outer joint member 23 side. In this case, as illustrated in FIG. 2A, the one boot end portion 35a is fitted over the receiving surface 40 being a boot receiving portion of the outer joint member 23. Next, the high-frequency induction heating coil 50A is fitted into the one boot end portion 35a from the non-opening portion side of the outer joint member 23. In this fitting, an inner diameter dimension DA of the coil 50A on a downstream side in the fitting direction is larger, and an outer diameter dimension Da of the boot end portion 35a on an upstream side in the fitting direction is smaller. That is, DA>Da is satisfied, and such a setting enables smooth fitting. A minimum inner diameter dimension of the high-frequency induction heating coil 50A is larger in diameter than a maximum outer diameter of the outer joint member 23.

Figure 2B:
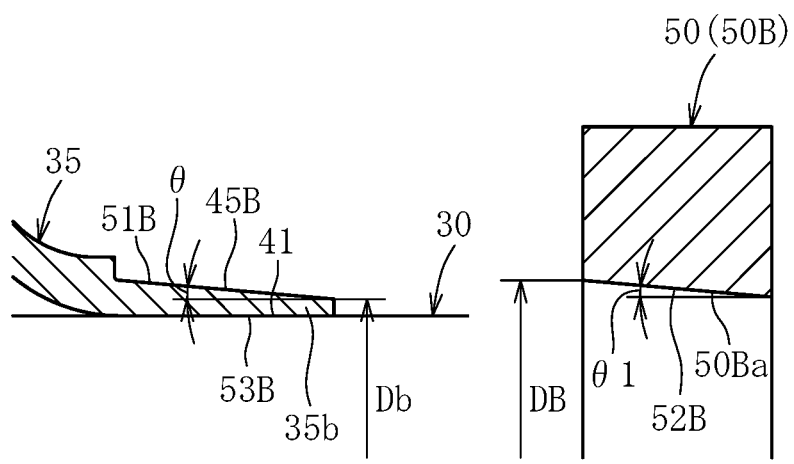
FIG. 2B is an illustration of the mounting method for the first high-frequency induction heating coil and is an enlarged sectional view of a shaft side.
Figure 3:
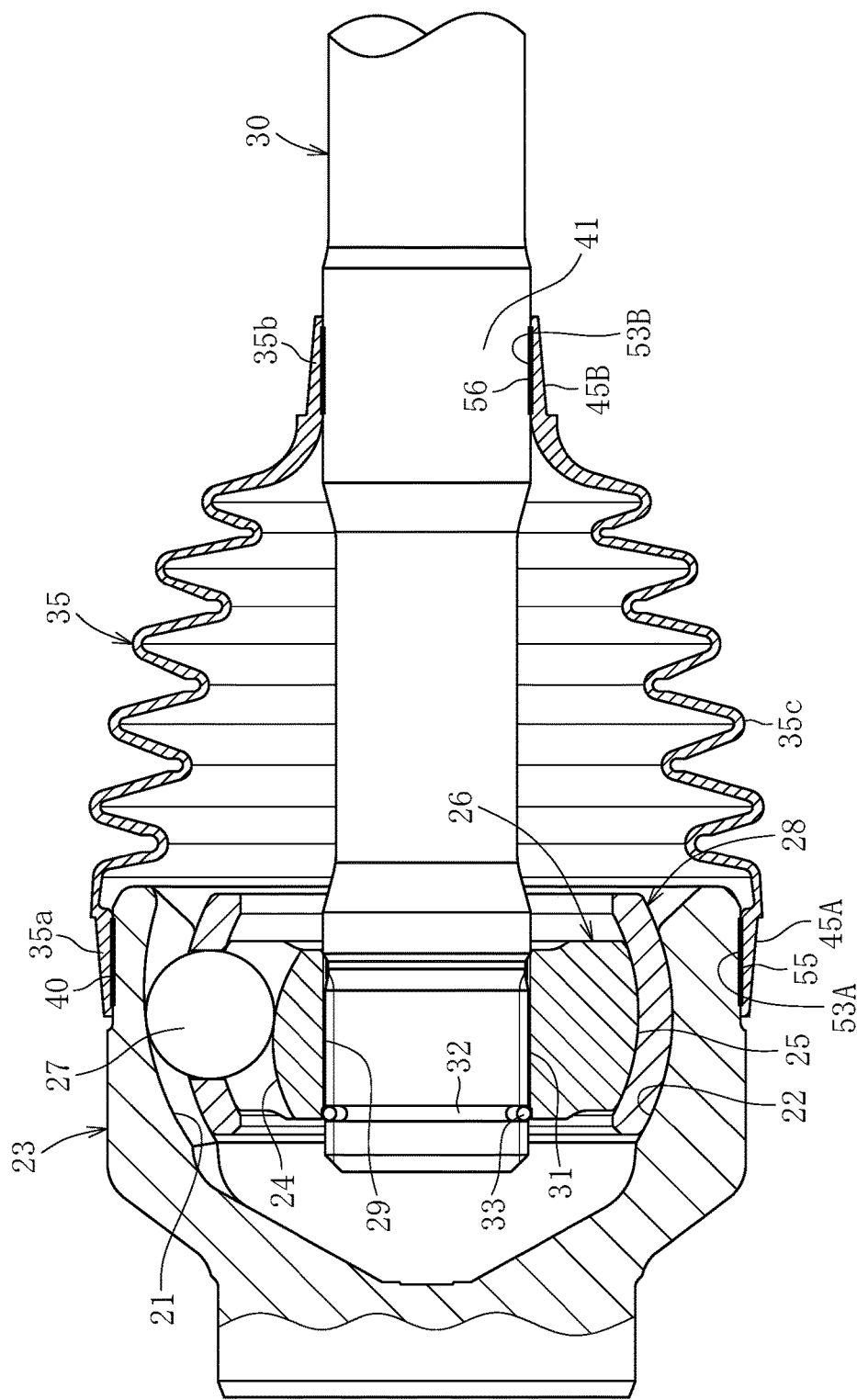
FIG. 3 is a sectional view of the constant velocity universal joint after the boot is mounted through use of the first high-frequency induction heating coils of a non-separable type.

Further, on the shaft 30 side, as illustrated in FIG. 2B, the other boot end portion 35b is fitted over the receiving surface 41 being the boot receiving portion of the shaft 30. Next, the high-frequency induction heating coil 50B is fitted into the other boot end portion 35b from the non-constant velocity universal joint side. In this fitting, an inner diameter dimension DB of the coil 50B on the downstream side in the fitting direction is larger, and an outer diameter dimension Db of the boot end portion 35b on the upstream side in the fitting direction is smaller. That is, DB>Db is satisfied, and such a setting enables smooth fitting. A minimum inner diameter dimension of the high-frequency induction heating coil 50B is larger in diameter than a maximum outer diameter of the shaft 30.

Under the state in which the high-frequency induction heating coils 50 (50A and 50B) are set as illustrated in FIG. 1, a high-frequency current is applied to the coils 50A and 50B. At this time, electromagnetic induction causes metal being conductive members (receiving surface 40 of outer joint member 23 and receiving surface 41 of shaft 30) to generate heat through core loss (sum of eddy current loss and hysteresis loss). The heat causes a boundary portion of resin (mounting surface 53A of one boot end portion 35a and mounting surface 53B of another boot end portion 35b) in contact with the metal (receiving surface 40 of outer joint member 23 and receiving surface 41 of shaft 30) to be rapidly heated to a temperature equal to or higher than a decomposition temperature, and then the boundary portion is decomposed, thereby generating bubbles. With this action, high-temperature and high-pressure conditions are given to the high-temperature melt in the periphery of the above-mentioned bubbles and to the surface of the metal (receiving surface 40 of outer joint member 23 and receiving surface 41 of shaft 30). As a result, as illustrated in FIG. 1, joined portions 55 and 56 (see FIG. 3) are obtained between the mounting surface 53A of the one end portion 35a of the boot 35 and the receiving surface 40 of the outer joint member 23 and between the mounting surface 53B of the other end portion 35b of the boot 35 and the receiving surface 41 of the shaft 30.

As a result, the mounting surface 53A of the boot end portion 35a and the receiving surface 40 of the outer joint member 23 are integrally joined to each other, and the mounting surface 53B of the boot end portion 35b and the receiving surface 41 of the shaft 30 are integrally joined to each other, thereby being capable of mounting and fixing the boot end portion 35a to the outer joint member 23 and mounting and fixing the boot end portion 35b to the shaft 30.

Figure 4:
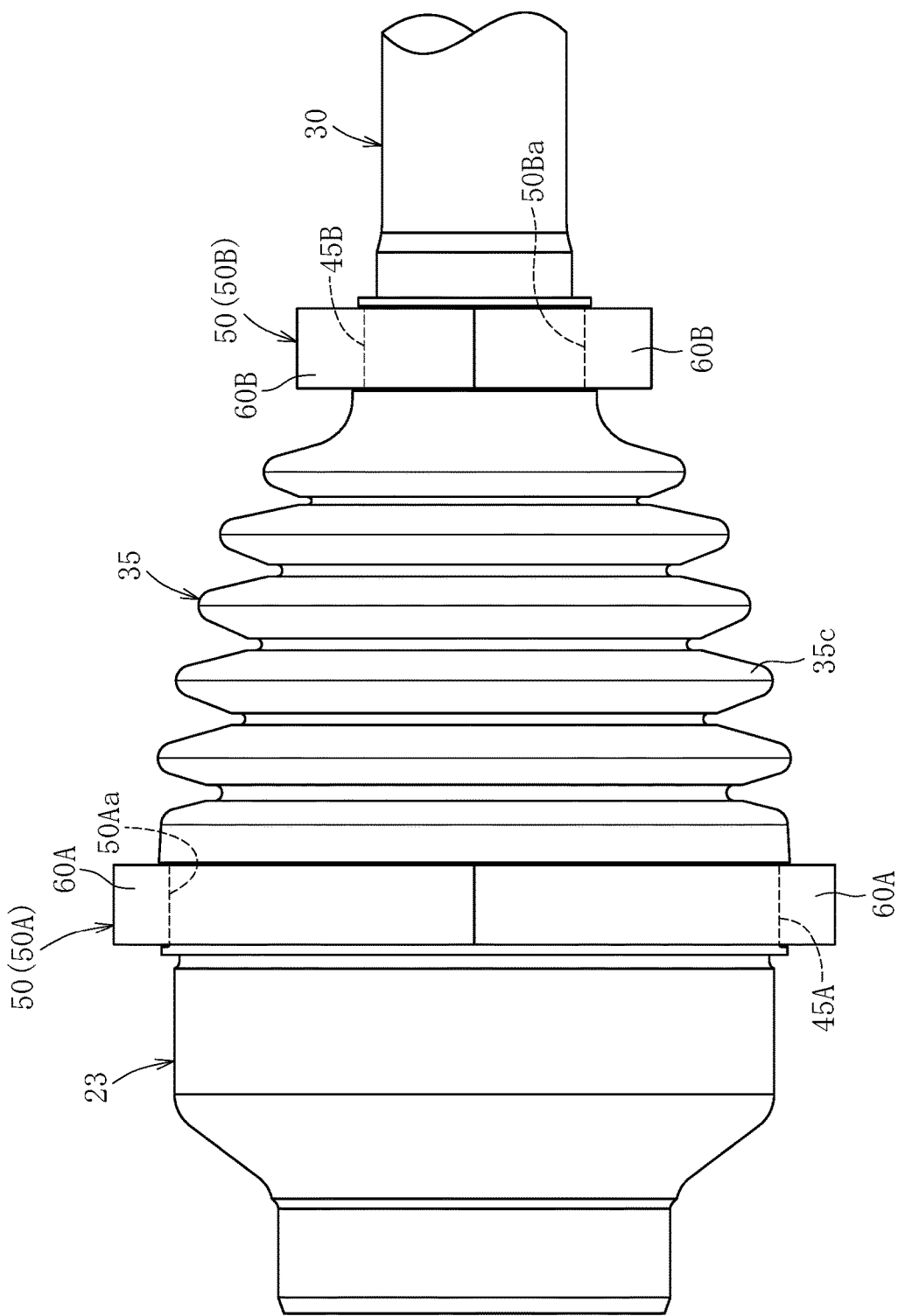
FIG. 4 is a side view for illustrating a state in which the boot is mounted through use of second high-frequency induction heating coils of a separable type.

Next, FIG. 4 is an illustration of second high-frequency induction heating coils 50A and 50B. The second high-frequency induction heating coils 50A and 50B comprise dividable ring members comprising a combined pair of arcuate members 60A and 60A and a combined pair of arcuate members 60B and 60B. Therefore, radially outer surfaces 45A and 45B of the boot end portions 35a and 35b (see FIG. 6) are formed into cylindrical surfaces 61A and 61B.

Figure 5:
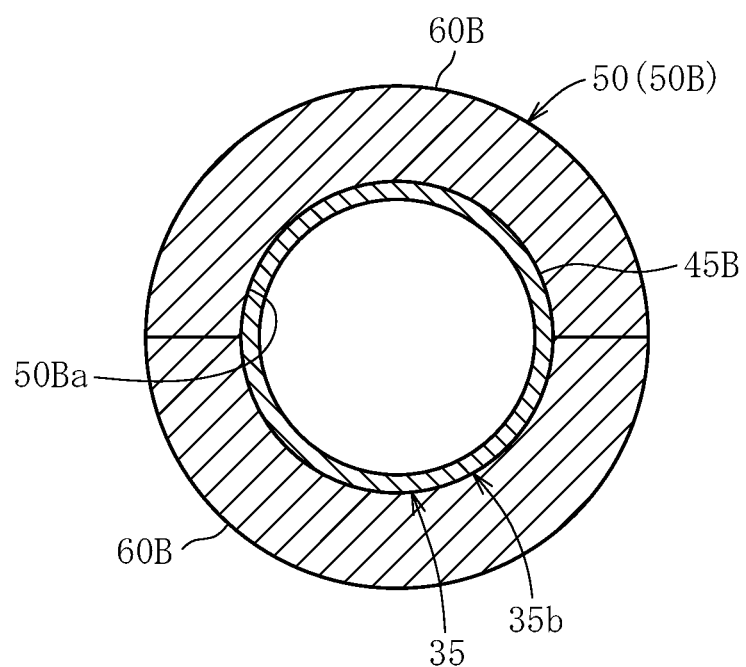
FIG. 5 is a cross-sectional view for illustrating a relationship between the boot and the second high-frequency induction heating coil of the separable type.

Thus, with the high-frequency induction heating coils 50A and 50B of a dividable type, the arcuate members 60A and 60A can be mounted (set) to the outer joint member 23 from a radially outer direction, and the arcuate members 60B and 60B can be mounted (set) to the shaft 30 from the radially outer direction. FIG. 5 is a sectional view for illustrating a state in which the high-frequency induction heating coil 50B is mounted to the mounting surface 53B of the boot end portion 35b and the receiving surface 41 of the shaft 30. In FIG. 5, the arcuate members 60B and 60B each have a semi-circular shape. As described above, the high-frequency induction heating coils 50A and 50B of the dividable type can be mounted (set) from the radially outer direction after the boot 35 is mounted to the outer joint member 23 and the shaft 30.

Figure 6:
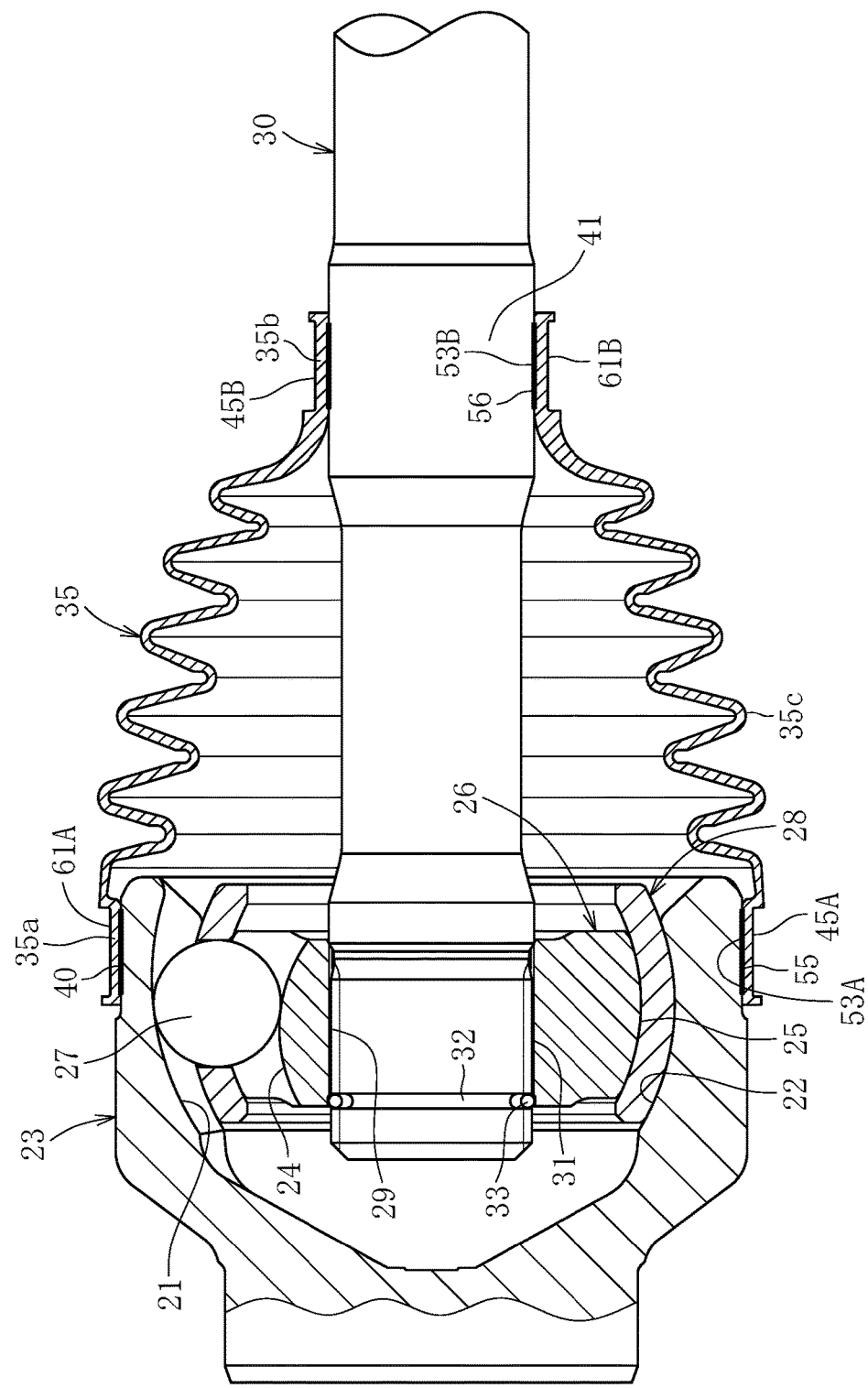
FIG. 6 is a sectional view for illustrating the constant velocity universal joint after the boot is mounted through use of the second high-frequency induction heating coils of the separable type illustrated in FIG. 4.
Figure 8A:
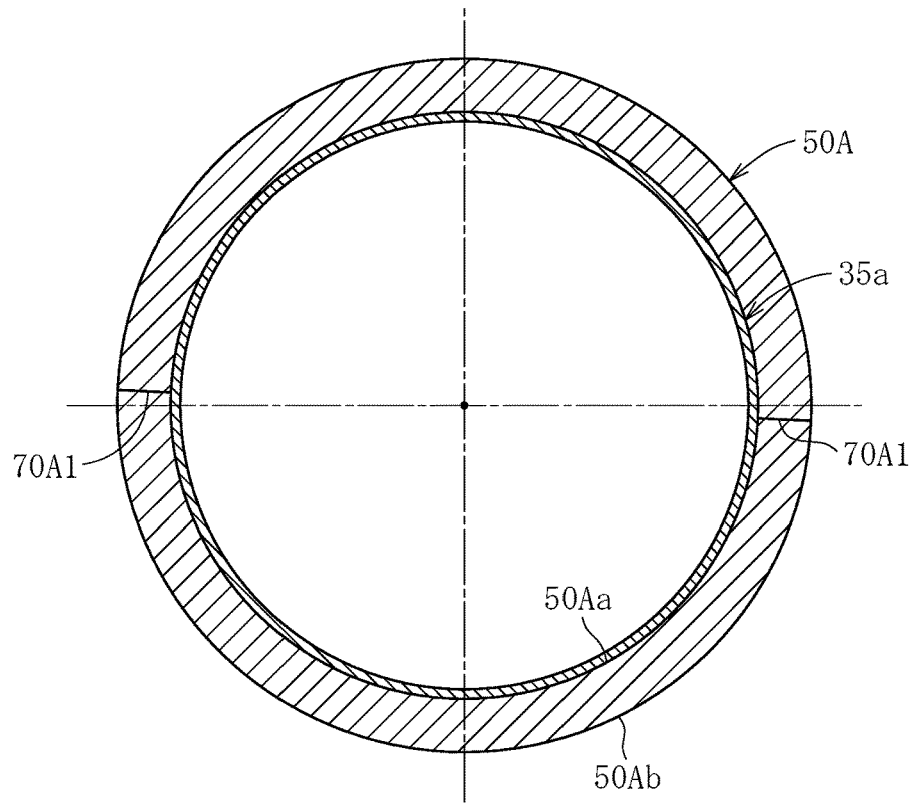
FIG. 8A is an illustration of a relationship between the third high-frequency induction heating coil and one boot end portion and is a sectional view taken along the line A1-A1 of FIG. 7.
Figure 8B:
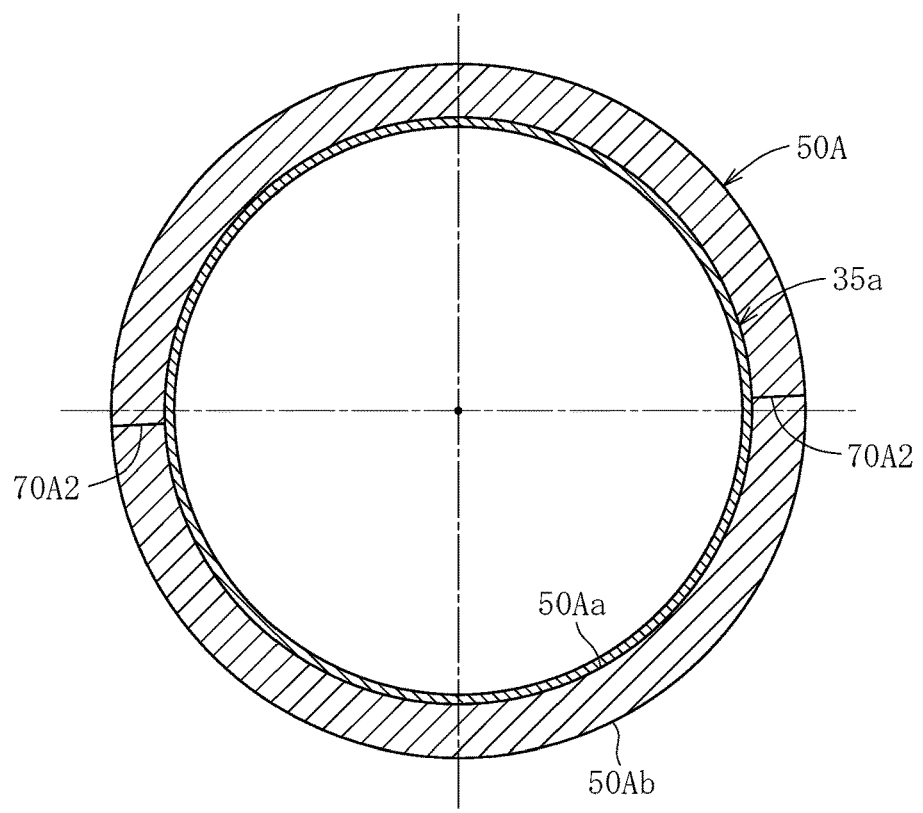
FIG. 8B is an illustration of the relationship between the third high-frequency induction heating coil and the one boot end portion and is a sectional view taken along the line B1-B1 of FIG. 7.
Figure 9A:
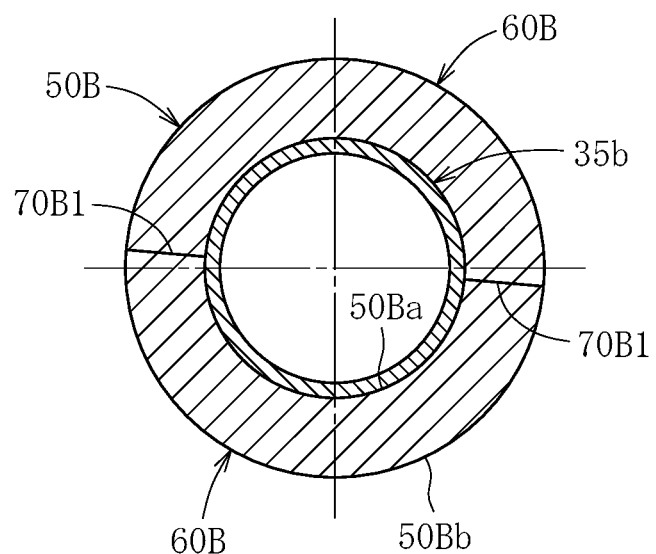
FIG. 9A is an illustration of a relationship between the third high-frequency induction heating coil and another boot end portion and is a sectional view taken along the line A2-A2 of FIG. 7.
Figure 9B:
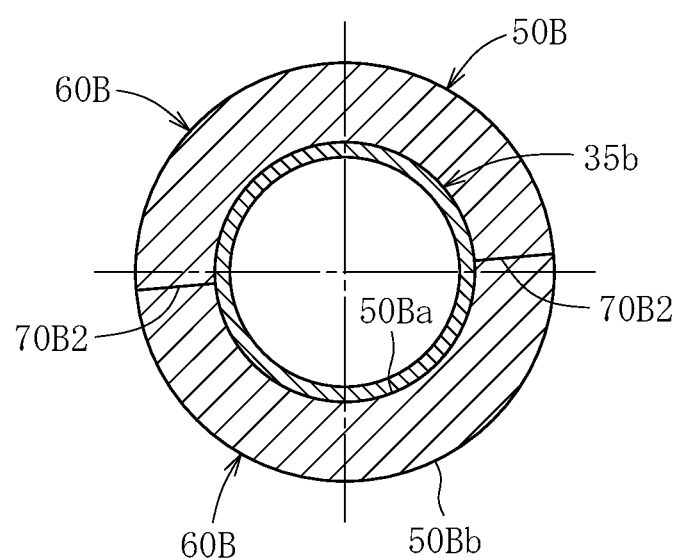
FIG. 9B is an illustration of the relationship between the third high-frequency induction heating coil and the other boot end portion and is a sectional view taken along the line B2-B2 of FIG. 7.

Under the state in which the high-frequency induction heating coils 50 (50A and 50B) of the dividable type are set as illustrated in FIG. 4, when a high-frequency current is applied to the coils 50A and 50B, as described above, the mounting surface 53A of the boot end portion 35a and the receiving surface 40 of the outer joint member 23 are integrally joined to each other, and the mounting surface 53B of the boot end portion 35b and the receiving surface 41 of the shaft 30 are integrally joined to each other, thereby being capable of mounting and fixing the boot end portion 35a to the outer joint member 23, and mounting and fixing the boot end portion 35b to the shaft 30, as illustrated in FIG. 6.

As described above, with the above-mentioned boot mounting method, the boot end portions 35a and 35b are present (interposed) between the high-frequency induction heating coils 50A and 50B and the heated objects (mating members). The boot material is rubber or resin and is a non-conductive material. Therefore, even when the high-frequency induction heating coils 50A and 50B and the boot end portions 35a and 35b are brought into contact with each other, the high-frequency induction heating coils 50A and 50B are prevented from being broken. Further, the thickness of the boot end portions 35a and 35b is generally constant. Therefore, when the high-frequency induction heating coils 50A and 50B are brought into contact with radially outer portions (non-adhering surfaces) of the mounting surfaces of the boot end portions 35a and 35b, gaps formed between the mating members being the heated objects and the high-frequency induction heating coils 50A and 50B can be maintained accurately in the circumferential direction.

Specifically, the gaps formed between the mating members (outer joint member 23 and shaft 30) being heated objects and the high-frequency induction heating coils 50A and 50B can be maintained accurately in the circumferential direction. Therefore, the adhesive strength (joining strength) in the circumferential direction is uniform, thereby achieving the stable joining strength. Further, relative movement between the mating members (outer joint member 23 and shaft 30) and the high-frequency induction heating coils 50A and 50B is not required. Therefore, is possible to reduce the size and weight of the high-frequency induction heating device which comprises the high-frequency induction heating coils 50A and 50B, thus contributing to reduction in cost.

Incidentally, it is preferred that the mounting surfaces 53A and 53B of the boot end portions 35a and 35b and the receiving surfaces 40 and 41 of the mating members (outer joint member 23 and shaft 30) have an interference corresponding to a diameter ratio of from 0.995 to 0.98. When the interference is equal to or more than 0.995, a microscopic contact is poor between the metal (outer joint member 23 and shaft 30) and the boot material. When the interference is larger than 0.98, the press-fit resistance of the boot 35 is large, with the result that there is a fear in that assembly is hindered.

Further, as illustrated in FIG. 1 and some other drawings, when the radially inner surfaces of the high-frequency induction heating coils 50A and 50B and the radially outer surfaces 45A and 45B being the non-mounting surfaces of the boot end portions 35a and 35b are formed into the tapered surfaces 51A, 51B, 52A, and 52B each reduced in diameter from the boot bellows portion side toward the boot end portion side, sides of the high-frequency induction heating coils 50A and 50B, which are larger in diameter, can be fitted into the boot end portions 35a and 35b from small-diameter sides. That is, the ease of mounting of the high-frequency induction heating coils 50A and 50B can be improved. Further, in the case where the tapered surfaces are brought into contact with each other as described above, when the high-frequency induction heating coils 50A and 50B are further pressed from the contact state, the contact strength can be increased. With this action, more stable joining strength can be obtained.

The tapered surfaces 51A, 51B, 52A, and 52B each have a taper angle set to from 5° to 30° based on the moldability of the boot 35. When the taper angle is less than 5°, the ease of fitting is degraded. When the taper angle is more than 30°, the gaps of the high-frequency induction heating coils 50A and 50B with respect to the heated portions may significantly differ at axial end portions. Therefore, there is a fear in that the surface temperature of the mating members may vary.

When the second high-frequency induction heating coils 50A and 50B of the separable type are used as illustrated in FIG. 4, it is preferred that the contact between the radially inner surfaces 50Aa and 50Ba and the radially outer surfaces 45A and 45B being the non-mounting surfaces of the boot end portions 35a and 35b have an interference. Even a small interference in the boot 35 may stabilize the gap amount of the joined portions in the circumferential direction. Further, when the interference is excessively large, the high-frequency induction heating coils 50A and 50B cannot be fully closed, with the result that the function cannot be achieved, that is, the high-frequency induction heating coils 50A and 50B cannot be constructed. Therefore, in this case, it is preferred that the interference be from 0.05 mm to 0.3 mm.

There arises no problem as long as an inner diameter difference between the boot end portion 35a (35b) and the coil 50A (50B) is set within a range in which the boot end portion 35a (35b) and the coil 50A (50B) can be brought into complete close contact with each other by elastic deformation of the boot material when the coil 50A (50B) is closed. However, the inner diameter difference may be from 0 mm to 0.3 mm.

In FIG. 7, third high-frequency induction heating coils 50 (50A and 50B) are used. The high-frequency induction heating coils 50A and 50B comprise the dividable ring members comprising the combined pair of arcuate members 60A and 60A and the combined pair of arcuate members 60B and 60B. Radially inner surfaces 50Aa and 50Ba and radially outer surfaces 50Ab and 50Bb of the high-frequency induction heating coils 50A and 50B are formed into cylindrical surfaces as illustrated in FIG. 8A, FIG. 8B, FIG. 9A, and FIG. 9B. Therefore, as illustrated in FIG. 6, the radially outer surfaces 45A and 45B of the boot end portions 35a and 35b are formed into cylindrical surfaces.

Figure 10A:
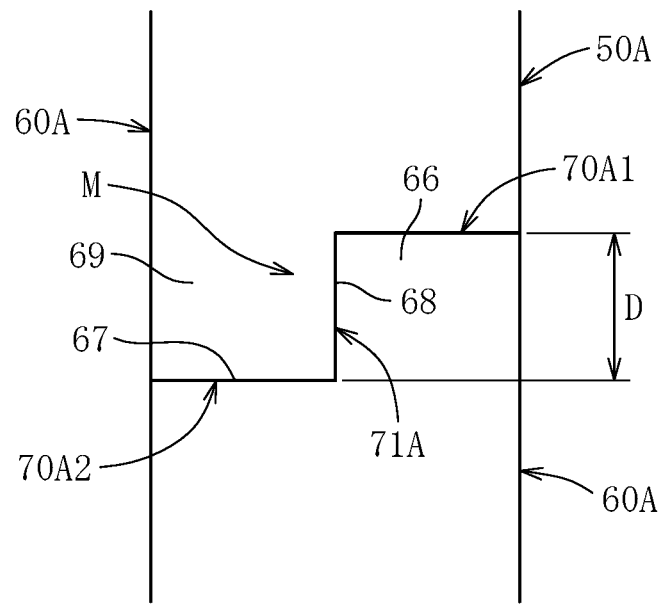
FIG. 10A is an illustration of the third high-frequency induction heating coil and is a schematic expansion view for illustrating the stepped structure illustrated in FIG. 8A and FIG. 8B.
Figure 10B:
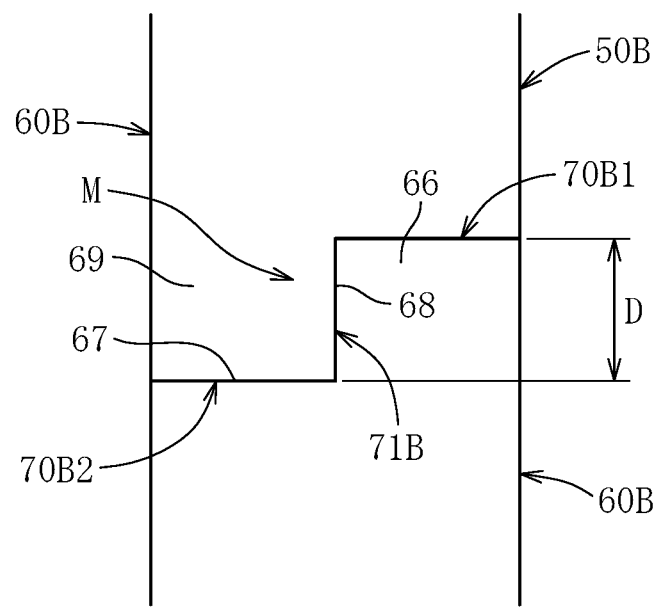
FIG. 10B is an illustration of the third high-frequency induction heating coil and is a schematic expansion view for illustrating the stepped structure illustrated in FIG. 9A and FIG. 9B.

The arcuate members 60A and 60A (60B and 60B) are formed into rings by bringing joined surfaces thereof into abutment against each other. In this case, mating surfaces of the arcuate members 60A and 60A (60B and 60B) each have the stepped structure M. Specifically, both end surfaces of each of the arcuate members 60A and 60A (60B and 60B) serve as abutment surfaces. As illustrated in FIG. 10A and FIG. 10B, any one of the abutment surfaces, which are opposed to (brought into abutment against) each other, has a protruding portion 66 and a recessed portion 67, and another of the abutment surfaces has a recessed portion 68, which is fitted to the protruding portion 66, and a protruding portion 69, thereby forming the stepped structure M. The stepped structure M has a step difference D of, for example, from about 3.0 mm to about 4.0 mm.

The high-frequency induction heating coils 50A and 50B are each formed of copper wires or the like having conductivity and may be solid members or hollow members. When the high-frequency induction heating coils 50A and 50B are the hollow members, coolant water can pass therein. When the high-frequency induction heating coils 50A and 50B are the solid members, it is preferred that the separate cooling jackets be provided to the high-frequency induction heating coils 50A and 50B.

Next, description is made of a boot mounting method using the third high-frequency induction heating coils 50 (50A and 50B) illustrated in FIG. 7 to FIG. 10A and FIG. 10B. First, description is made of the outer joint member 23 side. In this case, the one boot end portion 35a (see FIG. 6) is fitted over the receiving surface 40 (see FIG. 6) being the boot receiving portion of the outer joint member 23. Next, the abutment surfaces of the pair of arcuate members 60A and 60A are brought into abutment against each other from a radially outer side of the boot end portion 35a, thereby fitting the high-frequency induction heating coil 50A over the boot end portion 35a.

Further, on the shaft 30 side, the other boot end portion 35b (see FIG. 6) is fitted over the receiving surface 41 (see FIG. 6) being the boot receiving portion of the shaft 30. The abutment surfaces of the pair of arcuate members 60B and 60B are brought into abutment against each other from a radially outer side of the boot end portion 35b, thereby fitting the high-frequency induction heating coil 50B over the boot end portion 35b.

As described above, under the state in which the high-frequency induction heating coils 50 (50A and 50B) are set as illustrated in FIG. 7, a high-frequency current is applied to the coils 50A and 50B. At this time, electromagnetic induction causes metal being conductive members (receiving surface 40 of outer joint member 23 and receiving surface 41 of shaft 30) to generate heat through core loss (sum of eddy current loss and hysteresis loss). The heat causes a boundary portion of resin (mounting surface 53A of one boot end portion 35a and mounting surface 53B of another boot end portion 35b) in contact with the metal (receiving surface 40 of outer joint member 23 and receiving surface 41 of shaft 30) to be rapidly heated to a temperature equal to or higher than a decomposition temperature, and then the boundary portion is decomposed, thereby generating bubbles. With this action, high-temperature and high-pressure conditions are given to the high-temperature melt in the periphery of the above-mentioned bubbles and to the surface of the metal (receiving surface 40 of outer joint member 23 and receiving surface 41 of shaft 30). As a result, as illustrated in FIG. 7, the joined portions 55 and 56 (see FIG. 6) are obtained between the mounting surface 53A of the one end portion 35a of the boot 35 and the receiving surface 40 of the outer joint member 23 and between the mounting surface 53B of the other end portion 35b of the boot 35 and the receiving surface 41 of the shaft 30.

In the stepped structure M of the high-frequency induction heating coil 50A (50B), as illustrated in FIG. 10A and FIG. 10B, there are formed a pair of mating portions 70A1 and 70A2 (70B1 and 70B2), which extend in the axial direction, and a mating portion 71A (71B), which is continuously provided from the mating portions 70A1 and 70A2 (70B1 and 70B2) and extends in the circumferential direction. In this case, the pair of mating portions 70A1 and 70A2 (70B1 and 70B2) are different in phases, that is, different in positions in the circumferential direction.

Figure 11:
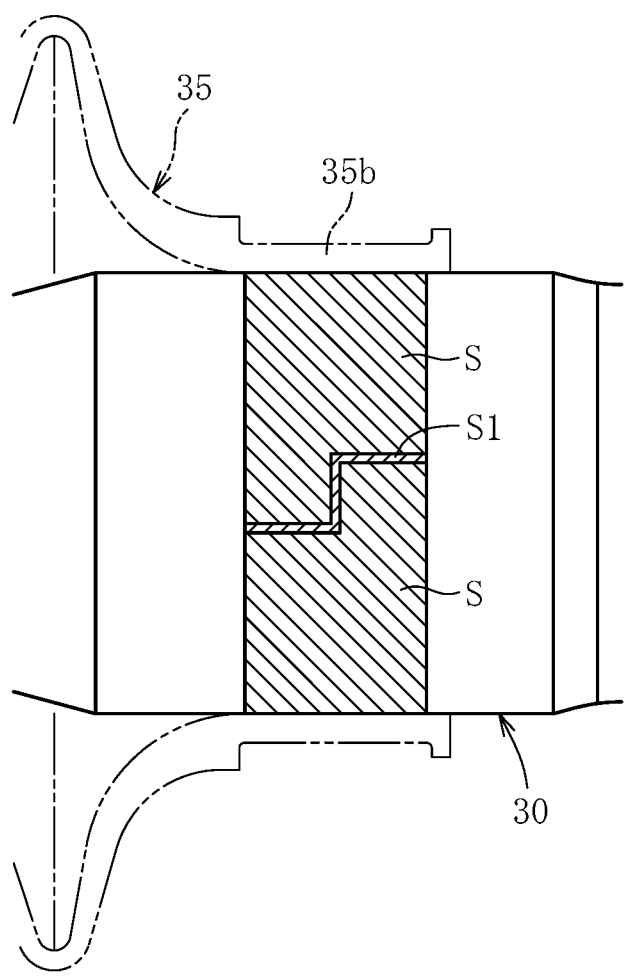
FIG. 11 is an explanatory view for illustrating a joined portion between the boot and a mating member.
Figure 12:
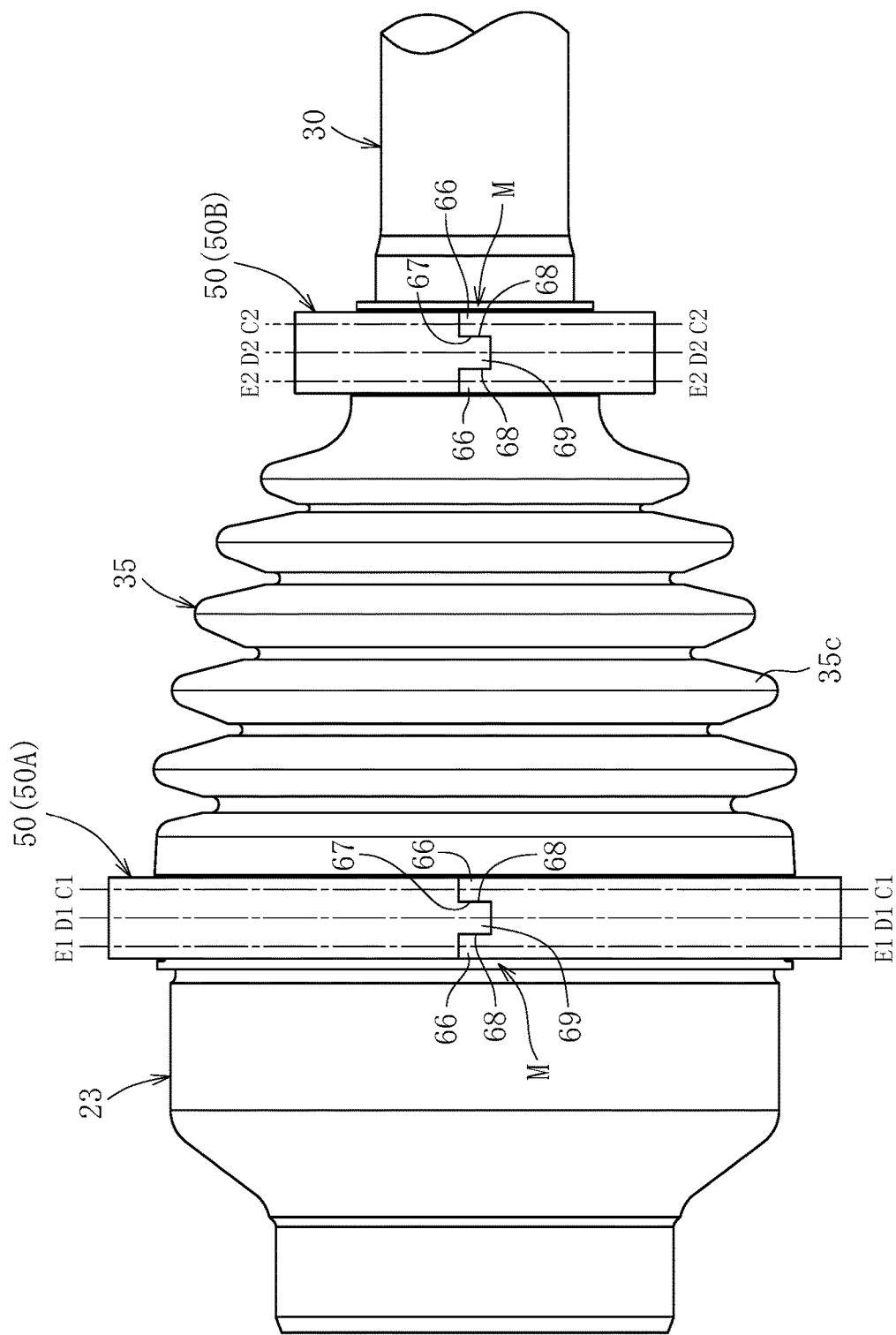
FIG. 12 is a side view of the constant velocity universal joint under a state in which the boot is mounted through use of fourth high-frequency induction heating coils.
Figure 13A:
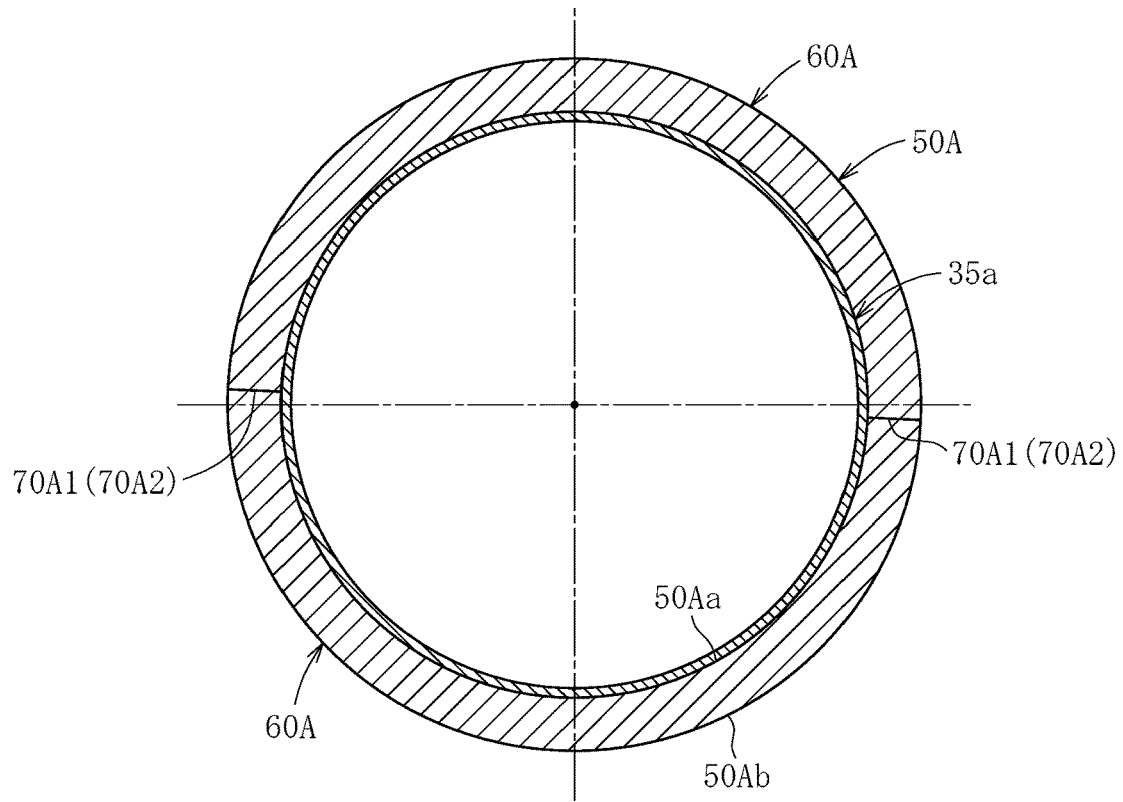
FIG. 13A is an illustration of a relationship between the fourth high-frequency induction heating coil and one boot end portion and is a sectional view taken along the line C1-C1 of FIG. 12 and a sectional view taken along the line E1-E1 of FIG. 12.
Figure 13B:
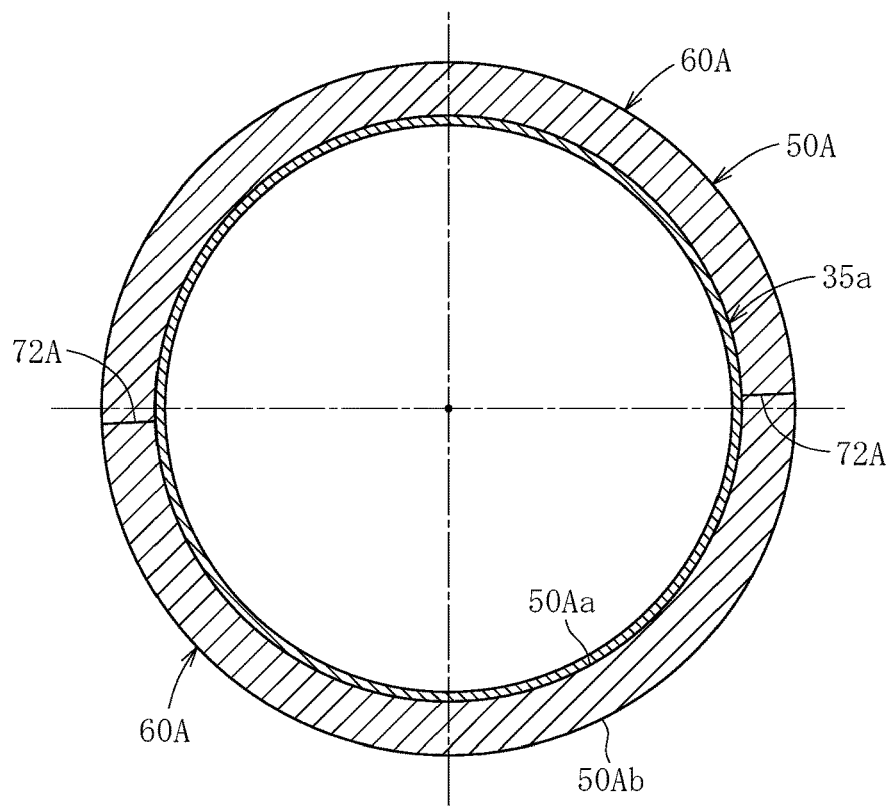
FIG. 13B is an illustration of the relationship between the fourth high-frequency induction heating coil and the one boot end portion and is a sectional view taken along the line D1-D1 of FIG. 12.
Figure 14A:
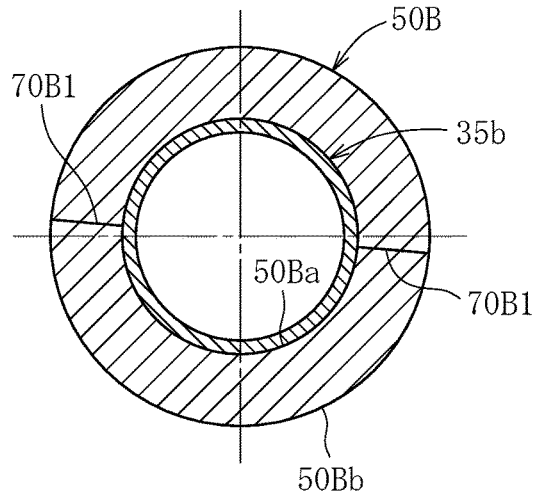
FIG. 14A is an illustration of a relationship between the fourth high-frequency induction heating coil and another boot end portion and is a sectional view taken along the line C2-C2 of FIG. 12.
Figure 14B:
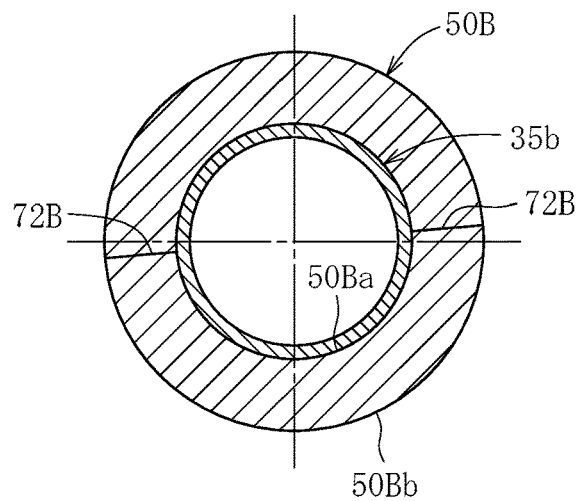
FIG. 14B is an illustration of the relationship between the fourth high-frequency induction heating coil and the other boot end portion and is a sectional view taken along the line D2-D2 of FIG. 12.
Figure 14C:
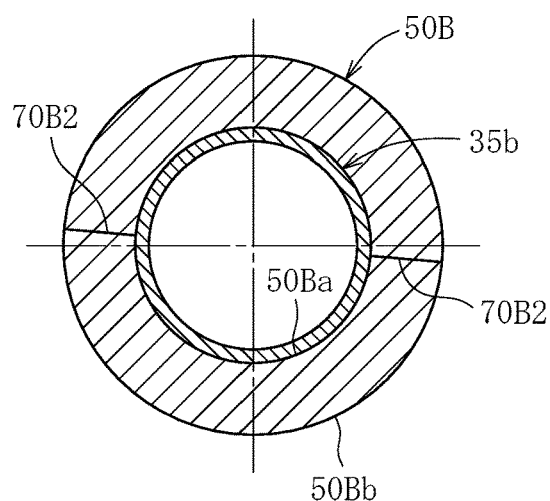
FIG. 14C is an illustration of the relationship between the fourth high-frequency induction heating coil and the other boot end portion and is a sectional view taken along the line E2-E2 of FIG. 12.

Incidentally, when the high-frequency induction heating coils 50A and 50B are of the above-mentioned separable type and are mounted to the boot end portions 35a and 35b as illustrated in FIG. 7, there is a fear in that a gap is formed among the mating portions 70A1, 70A2, and 71A (70B1, 70B2, and 71B). As described above, when the gap is formed, as illustrated in FIG. 11, a portion corresponding to the gap becomes a weak joined portion S1 between the boot end portion and the mating member. A portion which does not correspond to the gap becomes a rigid joined portion S. FIG. 11 is an illustration of a fixed portion between the boot end portion 35b and the shaft 30. Even at the fixed portion between the boot end portion 35a and the outer joint member 23, when the gap is formed among the mating portions 70A1, 70A2, and 71A, such a weak joined portion S1 and a rigid joined portion S are formed.

However, even though the weak joined portion S1 and the rigid joined portion S are formed, the weak joined portion S1 has a stepped shape and forms a so-called labyrinth structure. Therefore, the sealing function capable of achieving functions of preventing entry of foreign matters such as dust into the joint or preventing leakage of grease sealed in the joint can be achieved.

Figure 15A:
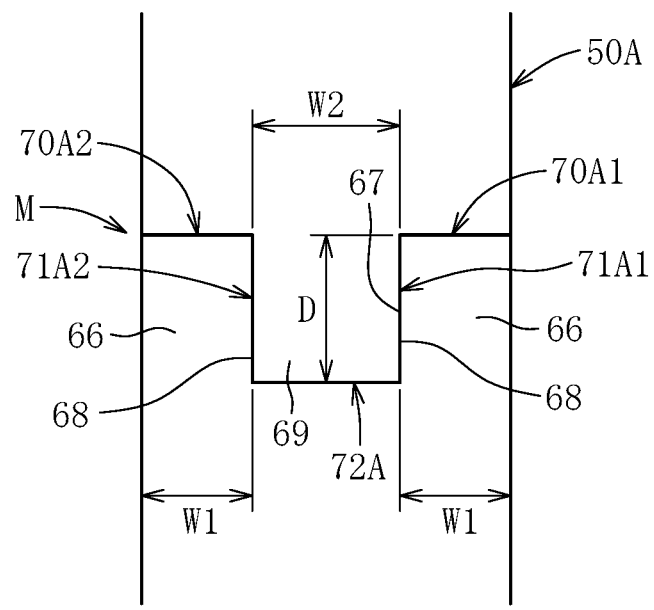
FIG. 15A is an illustration of the fourth high-frequency induction heating coil and is a schematic expansion view for illustrating the stepped structure illustrated in FIG. 13A and FIG. 13B.
Figure 15B:
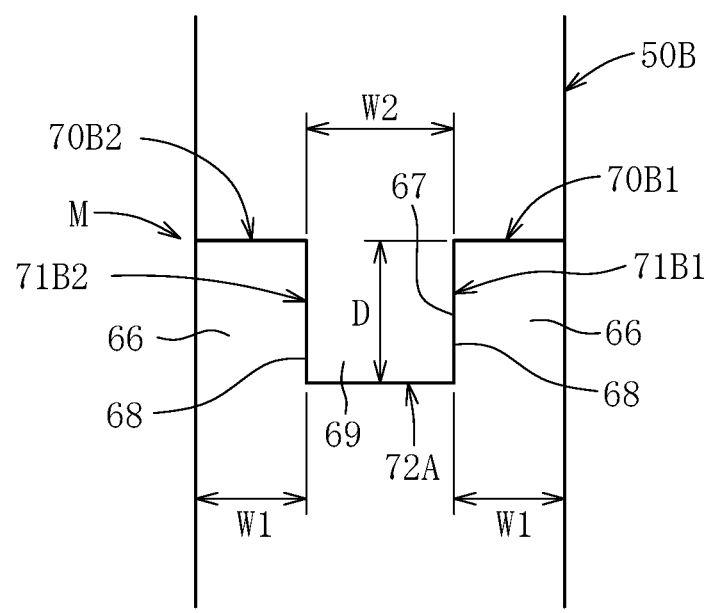
FIG. 15B is an illustration of the fourth high-frequency induction heating coil and is a schematic expansion view for illustrating the stepped structure of the high-frequency induction heating coil illustrated in FIG. 14A and FIG. 14B.

Next, in abutment surfaces of each of arcuate members 60A and 60A (60B and 60B) of fourth high-frequency induction heating coils 50A and 50B illustrated in FIG. 12 to FIG. 16, as illustrated in FIG. 15A and FIG. 15B, any one of the abutment surfaces has the pair of protruding portions 66 and 66 and the recessed portion 67 formed between the protruding portions 66 and 66, and another of the abutment surfaces has the pair of recessed portions 68 and 68, which are fitted to the protruding portions 66 and 66, and the protruding portion 69, which is fitted to the recessed portion 67. When a width dimension of the protruding portion 66 is W1, and a width dimension of the recessed portion 67 is W2, the width dimensions are set so as to satisfy W2>W1. Further, the stepped structure M has the step difference D of from about 3.0 mm to about 4.0 mm.

Therefore, even with those high-frequency induction heating coils 50A and 50B, when a high-frequency current is applied in a state of being mounted to the boot end portions 35a and 35b, joined portions 55 and 56 (see FIG. 6) are obtained between the mounting surface 53A of the one end portion 35a of the boot 35 and the receiving surface 40 of the outer joint member 23 and between the mounting surface 53B of the other end portion 35b of the boot 35 and the receiving surface 41 of the shaft 30.

In the stepped structure M of the high-frequency induction heating coil 50A (50B), there are formed the pair of mating portions 70A1 and 70A2 (70B1 and 70B2), which extend in the axial direction, mating portions 71A1 and 71A2 (71B1 and 71B2), which are continuously provided from the mating portions 70A1 and 70A2 (70B1 and 70B2) and extend in the circumferential direction, and the mating portion 72A (72B), which connects the mating portions 71A1 and 71A2 (71B1 and 71B2) to each other and extends in the axial direction. In this case, the mating portions 70A1 and 70A2 (70B1 and 70B2) and the mating portion 72A (72B) are different in phases, that is, different in positions in the circumferential direction.

Figure 16:
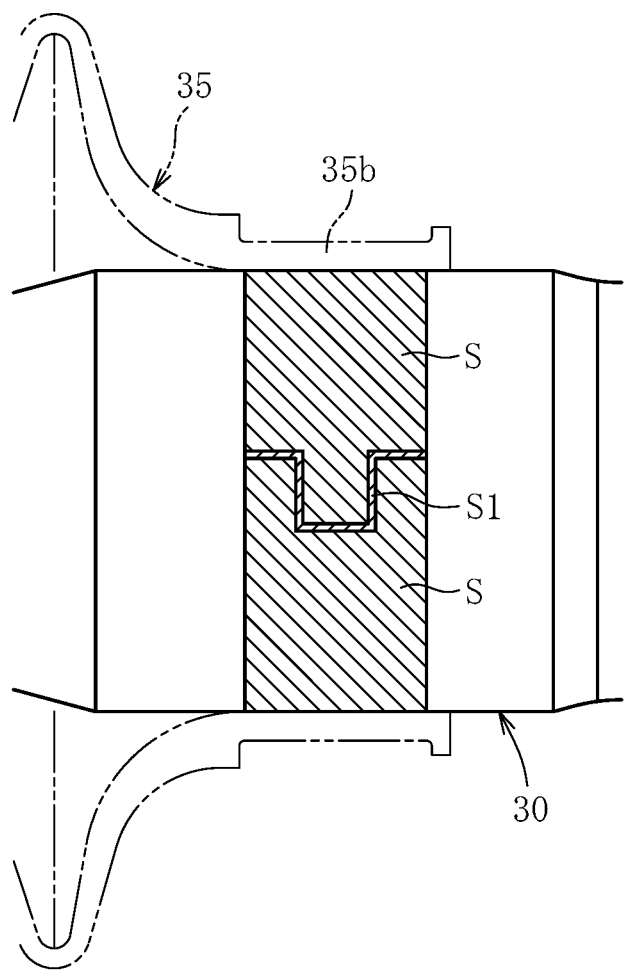
FIG. 16 is an explanatory view for illustrating a joined portion between the boot and the mating member.

Also in this case, there is a fear in that a gap is formed among the mating portions 70A1, 70A2, 71A1, 71A2, and 72A (70B1, 70B2, 71B1, 71B2, and 72B). As described above, when the gap is formed, as illustrated in FIG. 16, a portion corresponding to the gap becomes the weak joined portion S1 between the boot end portion and the mating member. The portion which does not correspond to the gap becomes the rigid joined portion S. FIG. 16 is an illustration of a fixed portion between the boot end portion 35b and the shaft 30. Even at the fixed portion between the boot end portion 35a and the outer joint member 23, when the gap is formed among the mating portions 70A1, 70A2, 71A1, 71A2, and 72A, such a weak joined portion S1 and a rigid joined portion S are formed.

However, also in this case, the weak joined portion S1 has the stepped shape and forms the so-called labyrinth structure. Therefore, the sealing function capable of achieving the functions of preventing entry of foreign matters such as dust into the joint or preventing leakage of grease sealed in the joint can be achieved. With a constant velocity universal joint using the above-mentioned boot mounting method, excellent sealability can be achieved for a long period of time.

Incidentally, in each of the above-mentioned embodiments, it is preferred that the mounting surfaces 53A and 53B of the boot end portions 35a and 35b and the receiving surfaces 40 and 41 of the mating members (outer joint member 23 and shaft 30) have an interference corresponding to a diameter ratio of from 0.995 to 0.98. When the interference is equal to or more than 0.995, a microscopic contact is poor between the metal and the boot material. When the interference is larger than 0.98, the press-fit resistance of the boot is large, with the result that there is a fear in that assembly is hindered.

Figure 17:
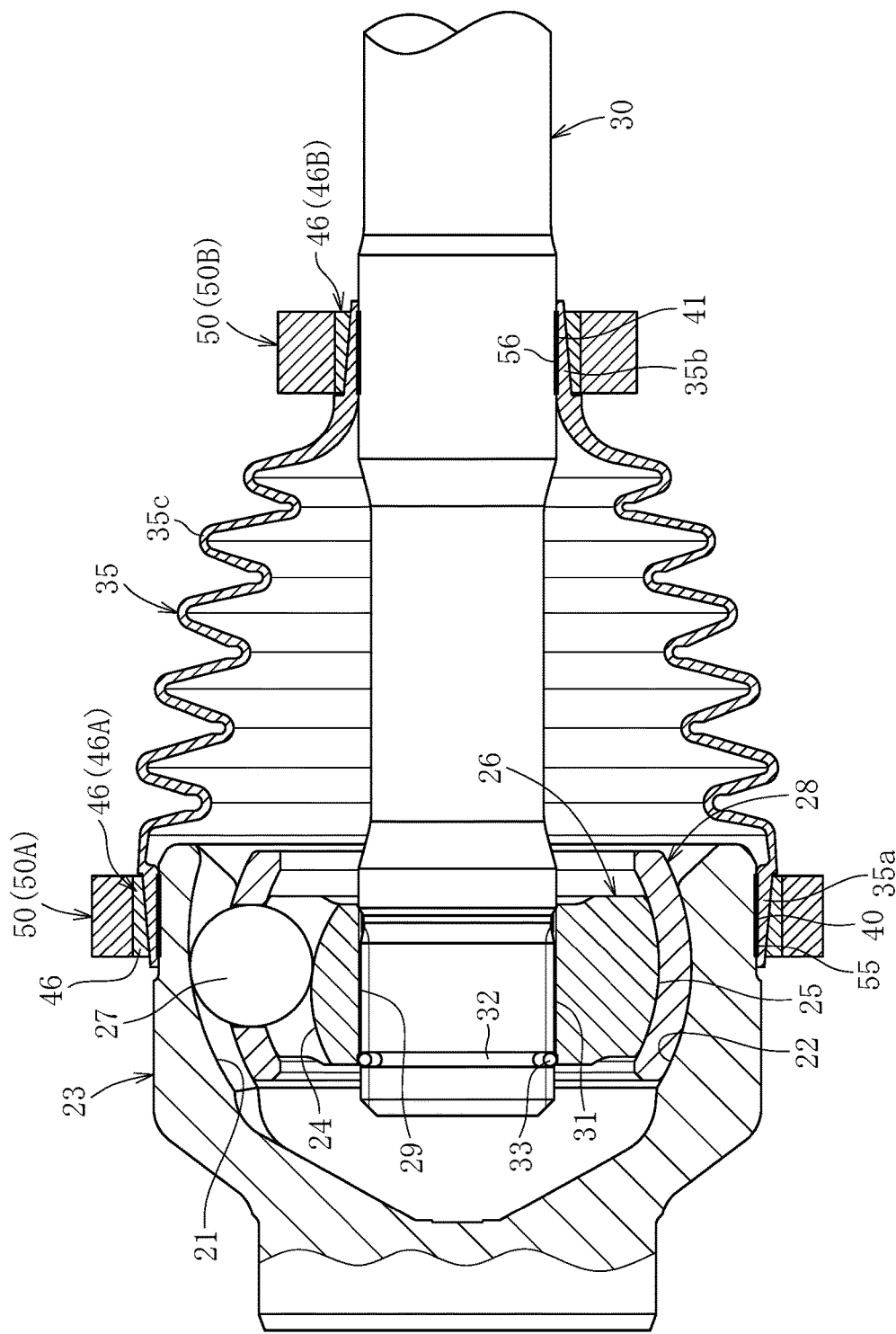
FIG. 17 is a side view of the constant velocity universal joint under a state in which the boot is mounted through use of fifth high-frequency induction heating coils.
Figure 18A:
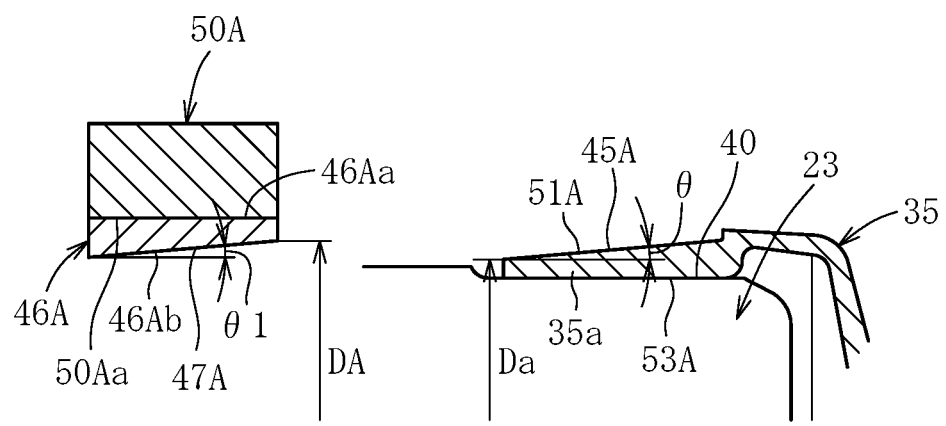
FIG. 18A is an illustration of a mounting method for the fifth high-frequency induction heating coil and is an enlarged sectional view of the outer joint member side.
Figure 18B:
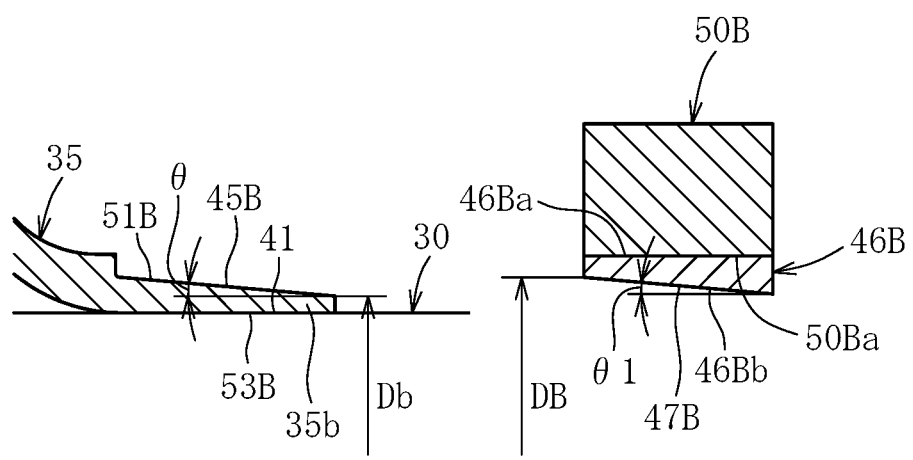
FIG. 18B is an illustration of the mounting method for the fifth high-frequency induction heating coil and is an enlarged sectional view of the shaft side.

As illustrated in FIG. 17, FIG. 18A, and FIG. 18B, fifth high-frequency induction heating coils 50 (50A and 50B) are used. In this case, the radially outer surfaces 45A and 45B being the non-mounting surfaces of the boot end portions 35a and 35b are the tapered surfaces 51A and 51B each reduced in diameter from the boot bellows portion side toward the boot end portion side. The tapered surfaces 51A and 51B each have the inclination angle θ set to from about 5° to about 30°.

Further, the high-frequency induction heating coils 50 (50A and 50B) comprise ring members, and heat-insulating materials 46A and 46B are provided to the radially inner surfaces 50Aa and 50Ba of the high-frequency induction heating coils 50 (50A and 50B). Radially outer surfaces 46Aa and 46Ba of the heat-insulating materials 46A and 46B are formed into cylindrical surfaces, and radially inner surfaces 46Ab and 46Bb of the heat-insulating materials 46A and 46B are formed into tapered surfaces 47A and 47B each reduced in diameter from the boot bellows portion side toward the boot end portion side. The tapered surfaces 47A and 47B each have an inclination angle θ1 set to from about 5° to about 30°. The high-frequency induction heating coils 50A and 50B are each formed of copper wires or the like having conductivity and may be solid members or hollow members.

The heat-insulating materials 46 (46A and 46B) may be of a general heat-insulating material such as ceramics, glass wool, ceramics fiber, cement plate, or silicone rubber. In this case, it is preferred that the heat-insulating materials be made of an inorganic material (inorganic compound) such as ceramics or glass wool having high heat resistance. Further, the heat-insulating material may be formed of foams of the inorganic material having a high heat insulating property.

Incidentally, the heat-insulating materials 46 (46Aa and 46B) are interposed to reduce transfer of heat to the high-frequency induction heating coils 50 (50A and 50B) because the heated objects (outer joint member 23 and shaft 30 being mating members) and the high-frequency induction heating coils 50 (50A and 50B) are not cooled. Thus, various thicknesses may be employed for the heat-insulating materials 46 (46A and 46B) in accordance with a material to be used. However, it is necessary to set a dimension which can reduce the transfer of heat to the high-frequency induction heating coils 50 (50A and 50B).

Next, description is made of a mounting method for a boot 35 using the fifth high-frequency induction heating coils 50 (50A and 50B) illustrated in FIG. 17 to FIG. 18B. First, description is made of the outer joint member 23 side. In this case, as illustrated in FIG. 18A, the one boot end portion 35a is fitted over the receiving surface 40 being the boot receiving portion of the outer joint member 23. Next, the high-frequency induction heating coil 50A is fitted into the one boot end portion 35a from the non-opening portion side of the outer joint member 23. In this fitting, the inner diameter dimension (inner diameter dimension of heat-insulating material) DA of the coil 50A on the downstream side in the fitting direction is larger, and the outer diameter dimension Da of the boot end portion 35a on the upstream side in the fitting direction is smaller. That is, DA>Da is satisfied, and such a setting enables smooth fitting.

Further, on the shaft 30 side, as illustrated in FIG. 18B, the other boot end portion 35b is fitted over the receiving surface 41 being the boot receiving portion of the shaft 30. Next, the high-frequency induction heating coil 50B is fitted into the other boot end portion 35b from the non-constant velocity universal joint side. In this fitting, the inner diameter dimension (inner diameter dimension of heat-insulating material) DB of the coil 50B on the downstream side in the fitting direction is larger, and the outer diameter dimension Db of the boot end portion 35b on the upstream side in the fitting direction is smaller. That is, DB>Db is satisfied, and such a setting enables smooth fitting.

As described above, under the state in which the high-frequency induction heating coils 50 (50A and 50B) are set as illustrated in FIG. 17, a high-frequency current is applied to the coils 50A and 50B. At this time, electromagnetic induction causes metal being conductive members (receiving surface 40 of outer joint member 23 and receiving surface 41 of the shaft 30) to generate heat through core loss (sum of eddy current loss and hysteresis loss). The heat causes a boundary portion of resin (mounting surface 53A of one boot end portion 35a (see FIG. 18A) and mounting surface 53B of another boot end portion 35b (see FIG. 18B)) in contact with the metal (receiving surface 40 of outer joint member 23 and receiving surface 41 of shaft 30) to be rapidly heated to a temperature equal to or higher than a decomposition temperature, and then the boundary portion is decomposed, thereby generating bubbles. With this action, high-temperature and high-pressure conditions are given to the high-temperature melt in the periphery of the above-mentioned bubbles and to the surface of the metal (receiving surface 40 of outer joint member 23 and receiving surface 41 of shaft 30). As a result, as illustrated in FIG. 1, joined portions 55 and 56 (see FIG. 17) are obtained between the mounting surface 53A of the one end portion 35a of the boot 35 (see FIG. 18A) and the receiving surface 40 of the outer joint member 23 and between the mounting surface 53B of the other end portion 35b of the boot 35 (see FIG. 18B) and the receiving surface 41 of the shaft 30.

As a result, the mounting surface 53A of the boot end portion 35a (see FIG. 18A) and the receiving surface 40 of the outer joint member 23 are integrally joined to each other, and the mounting surface 53B of the boot end portion 35b (see FIG. 18B) and the receiving surface 41 of the shaft 30 are integrally joined to each other, thereby being capable of mounting and fixing the boot end portion 35a to the outer joint member 23 and mounting and fixing the boot end portion 35b to the shaft 30.

Figure 19:
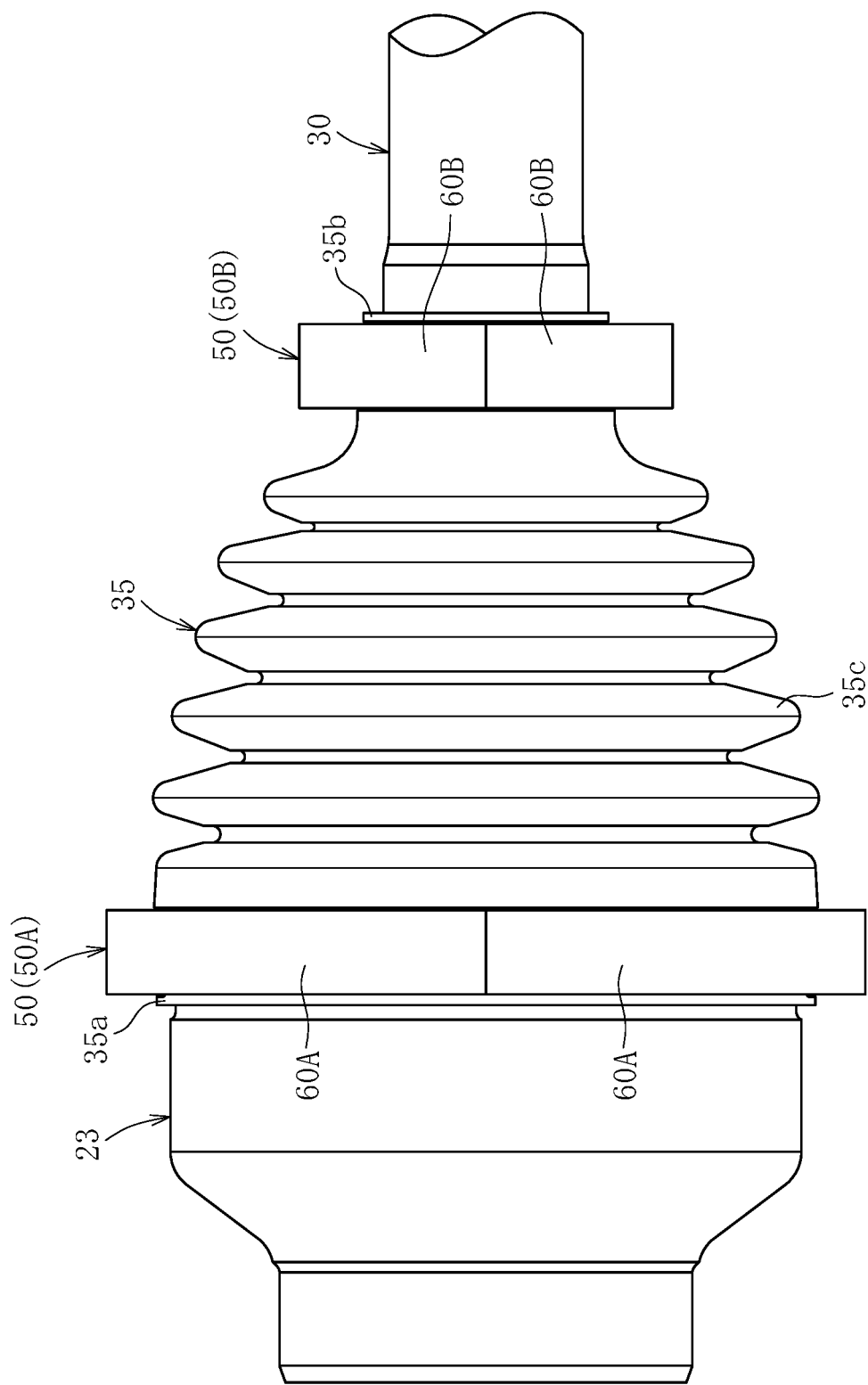
FIG. 19 is a side view for illustrating a state in which the boot is mounted through use of sixth high-frequency induction heating coils of the separable type.
Figure 20A:
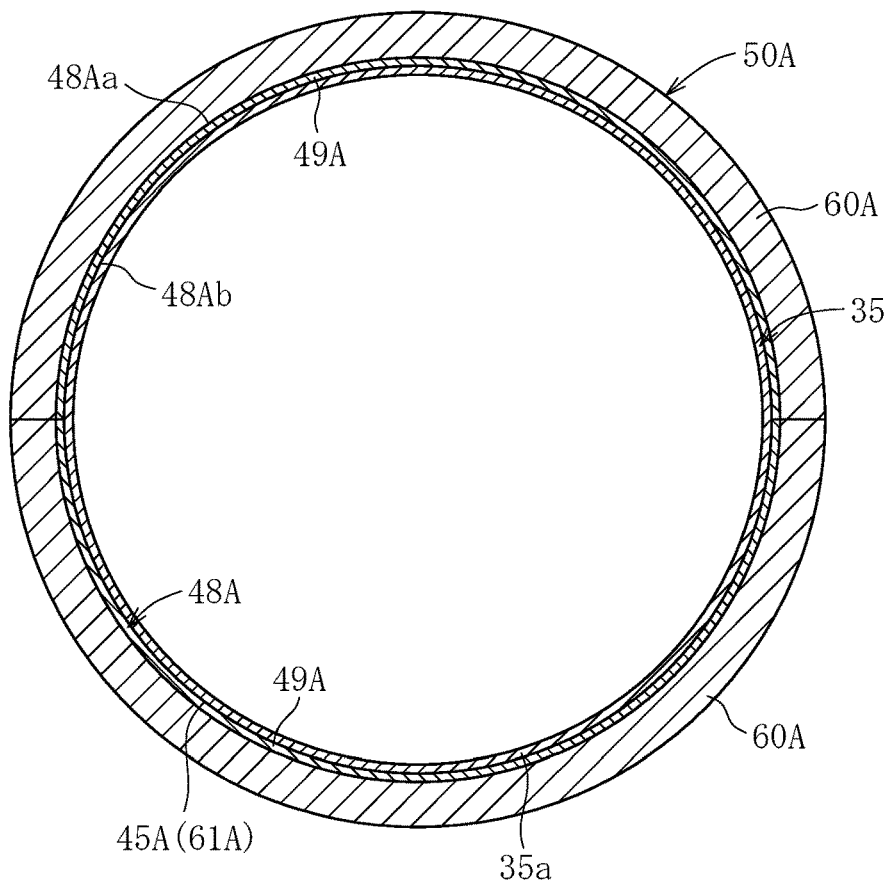
FIG. 20A is an illustration of a relationship between the boot and the sixth high-frequency induction heating coil of the separable type and is a sectional view for illustrating the outer joint member side.
Figure 20B:
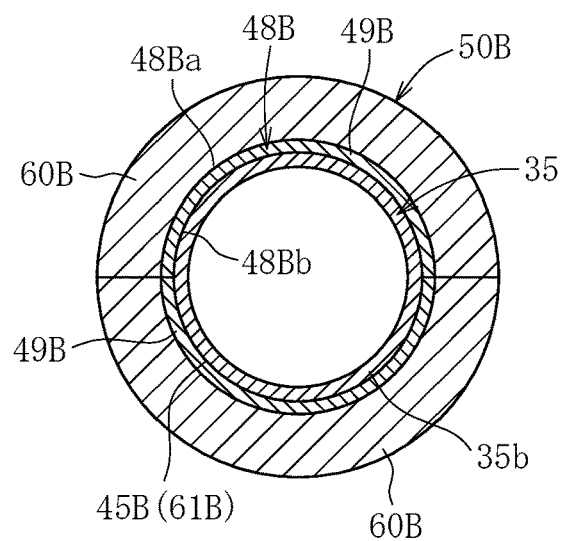
FIG. 20B is an illustration of the relationship between the boot and the sixth high-frequency induction heating coil of the separable type and is a sectional view for illustrating the shaft side.

Next, FIG. 19 is an illustration of sixth high-frequency induction heating coils 50A and 50B. The sixth high-frequency induction heating coils 50A and 50B comprise the dividable ring members comprising the combined pair of arcuate members 60A and 60A and the combined pair of arcuate members 60B and 60B. Therefore, the radially outer surfaces 45A and 45B of the boot end portions 35a and 35b are formed into the cylindrical surfaces 61A and 61B (see FIG. 6). Also in this case, as illustrated in FIG. 20A and FIG. 20B, the heat-insulating materials 48A and 48B are provided to the radially inner surfaces of the high-frequency induction heating coils 50A and 50B, respectively.

The heat-insulating material 48A comprises a pair of semi-arcuate members 49A and 49A, and the heat-insulating material 48B comprises a pair of semi-arcuate members 49B and 49B. The semi-arcuate members 49A, 49A, 49B, and 49B are provided to the arcuate members 60A, 60A, 60B, and 60B. Further, radially outer surfaces 48Aa and 48Ba and radially inner surfaces 48Ab and 48Bb of the heat-insulating materials 48A and 48B are formed into cylindrical surfaces.

Thus, with the high-frequency induction heating coils 50A and 50B of the dividable type, as illustrated in FIG. 19, the arcuate members 60A and 60A can be mounted (set) to the outer joint member 23 from the radially outer direction, and the arcuate members 60B and 60B can be mounted (set) to the shaft 30 from the radially outer direction.

Under the state in which the high-frequency induction heating coils 50 (50A and 50B) of the dividable type are set as illustrated in FIG. 19, when a high-frequency current is applied to the coils 50A and 50B, as described above, the mounting surface 53A of the boot end portion 35a (see FIG. 6) and the receiving surface 40 of the outer joint member 23 (see FIG. 6) are integrally joined to each other, and the mounting surface 53B of the boot end portion 35b (see FIG. 6) and the receiving surface 41 of the shaft 30 (see FIG. 6) are integrally joined to each other, thereby being capable of mounting and fixing the boot end portion 35a to the outer joint member 23, and mounting and fixing the boot end portion 35b to the shaft 30, as illustrated in FIG. 6.

As described above, with the above-mentioned boot mounting method, the boot end portions 35a and 35b are present (interposed) between the high-frequency induction heating coils 50A and 50B and the heated objects (mating members). The boot material is resin and is a non-conductive material. Therefore, even when the high-frequency induction heating coils 50A and 50B and the boot end portions 35a and 35b are brought into contact with each other through intermediation of the heat-insulating materials 46A and 46B, the high-frequency induction heating coils 50A and 50B are prevented from being broken. Further, the thickness of the boot end portions 35a and 35b is generally constant. Therefore, when the high-frequency induction heating coils 50A and 50B are brought into contact with radially outer portions (non-adhering surfaces) of the mounting surfaces of the boot end portions 35a and 35b through intermediation of the heat-insulating materials 46A and 46B, the gaps formed between the mating members being the heated objects and the high-frequency induction heating coils 50A and 50B can be maintained accurately in the circumferential direction.

Specifically, the gaps formed between the mating members (outer joint member 23 and shaft 30) being the heated objects and the high-frequency induction heating coils 50A and 50B can be maintained accurately in the circumferential direction. Therefore, the adhesive strength (joining strength) in the circumferential direction is uniform, thereby achieving the stable joining strength. Further, relative movement between the mating members (outer joint member 23 and shaft 30) and the high-frequency induction heating coils 50A and 50B is not required, thereby being capable of reducing the size and weight of the high-frequency induction heating device which comprises the high-frequency induction heating coils 50A and 50B, thus contributing to reduction in cost.

Further, the heat-insulating materials 46A and 46B and the boot end portions 35a and 35b are present (interposed) between the high-frequency induction heating coils 50A and 50B and the heated objects (mating member), thereby being capable of suppressing the transfer of heat to the high-frequency induction heating coils 50A and 50B. Therefore, there are advantages in that the stable output and joining strength can be obtained even during continuous use and that longer lifetime of the coil can be achieved. Further, adhesion of the boot 35 and the high-frequency induction heating coils 50A and 50B caused by the rise in temperature of the coil can be prevented, thereby being excellent in operability.

Incidentally, it is preferred that the mounting surfaces 53A and 53B of the boot end portions 35a and 35b and the receiving surfaces 40 and 41 of the mating members (outer joint member 23 and shaft 30) have an interference corresponding to a diameter ratio of from 0.995 to 0.98. When the interference is less than 0.995, a microscopic contact is poor between the metal (outer joint member 23 and shaft 30) and the boot material. When the interference is larger than 0.98, the press-fit resistance of the boot 35 is large, with the result that there is a fear in that assembly is hindered.

Further, as illustrated in FIG. 18 and some other drawings, when the radially inner surfaces 46Ab and 46Bb of the heat-insulating materials 46A and 46B and the radially outer surfaces 45A and 45B being the non-mounting surfaces of the boot end portions 35a and 35b are formed into the tapered surfaces 47A, 47B, 51A, and 51B each reduced in diameter from the boot bellows portion side toward the boot end portion side, the sides of the high-frequency induction heating coils 50A and 50B, which are larger in diameter, can be fitted into the boot end portions 35a and 35b from the small-diameter sides. Thus, the ease of mounting (ease of setting) of the high-frequency induction heating coils 50A and 50B can be improved. Further, in the case where the tapered surfaces are brought into contact with each other as described above, when the high-frequency induction heating coils 50A and 50B are further pressed from the contact state, the contact strength can be increased. With this action, more stable joining strength can be obtained.

The tapered surfaces 47A, 47B, 51A, and 51B each have a taper angle set to from 5° to 30° based on the moldability of the boot 35. When the taper angle is less than 5°, the ease of fitting is degraded. When the taper angle is more than 30°, the gaps of the high-frequency induction heating coils 50A and 50B with respect to the heated portions may significantly differ at the axial end portions. Therefore, there is a fear in that the surface temperatures of the mating members may vary.

When the high-frequency induction heating coils 50A and 50B of the separable type are used as illustrated in FIG. 19, it is preferred that the contact between the radially inner surfaces 46Ab and 46Bb of the heat-insulating materials 46A and 46B and the radially outer surfaces 45A and 45B being the non-mounting surfaces of the boot end portions 35a and 35b have an interference. Even a small interference in the boot 35 may stabilize the gap amount of the joined portions in the circumferential direction. Further, when the interference is excessively large, the high-frequency induction heating coils 50A and 50B cannot be fully closed, with the result that the function cannot be achieved, that is, the high-frequency induction heating coils 50A and 50B cannot be constructed. Therefore, in this case, it is preferred that the interference be from 0.05 mm to 0.3 mm.

There arises no problem as long as inner diameter differences between the boot end portions 35a and 35b and the radially inner surfaces of 46Ab and 46Bb of the heat-insulating materials 46A and 46B are set within a range in which the boot end portions 35a and 35b and the coils 50A and 50B can be brought into complete close contact with each other by elastic deformation of the boot material when the coils 50A and 50B are closed. However, the inner diameter differences may be from 0 mm to 0.3 mm.

Figure 21:
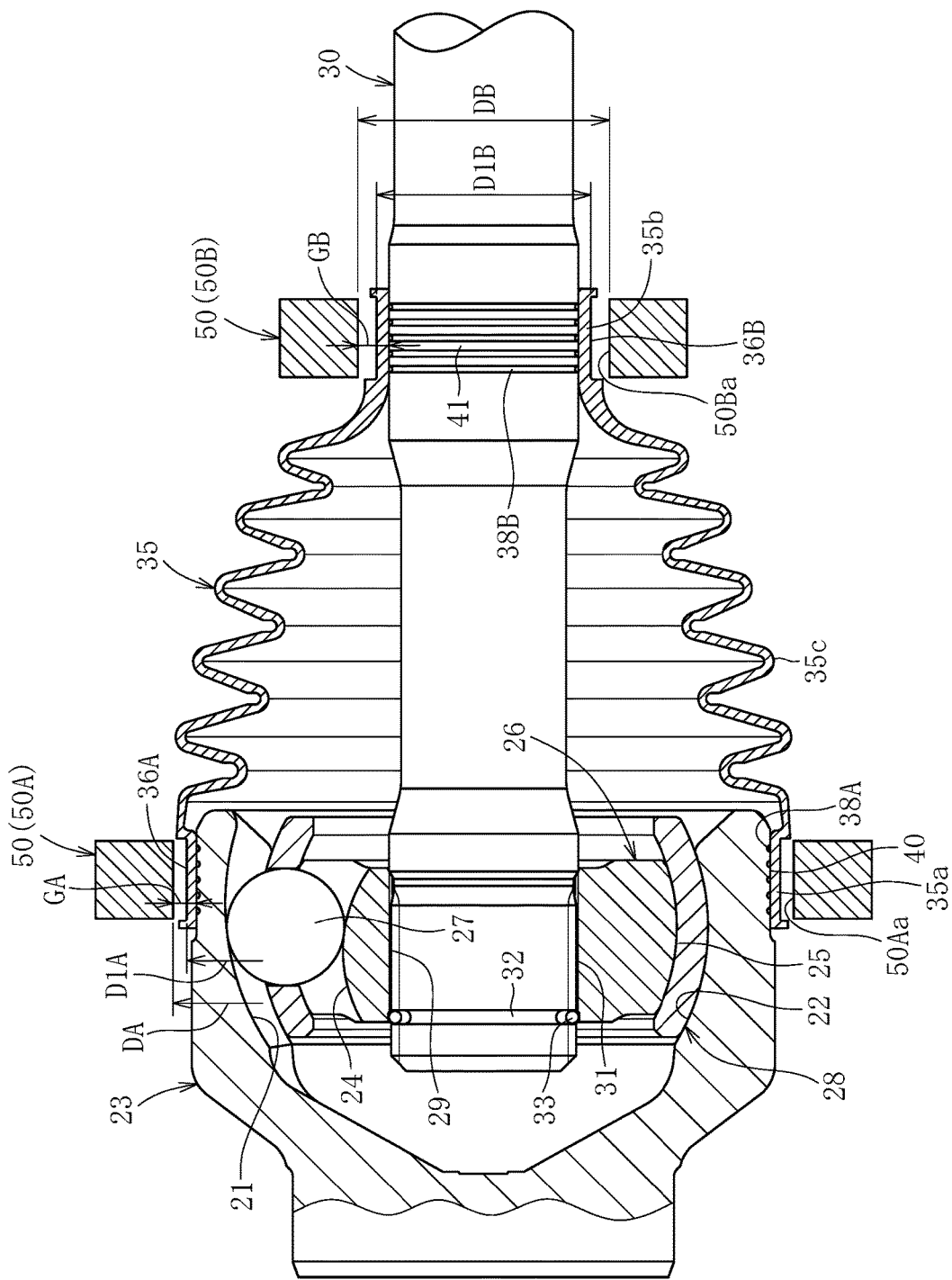
FIG. 21 is a sectional view of a second constant velocity universal joint under a state in which the boot is mounted through use of seventh high-frequency induction heating coils.

FIG. 21 is an illustration of a case where seventh high-frequency induction heating coils 50 (50A and 50B) being the ring members are used. In this case, an inner diameter dimension of a radially inner surface 50Aa of the high-frequency induction heating coil 50A is set larger than an outer diameter dimension of the boot end portion 35a which is fitted over the receiving surface 40 of the outer joint member 23. As illustrated in FIG. 22, the radially outer surface 45A of the boot end portion 35a has a circumferential recessed groove 36A, and a diameter dimension of a bottom surface of the circumferential recessed groove 36A corresponds to an outer diameter dimension of the boot end portion 35a.

Figure 22A:
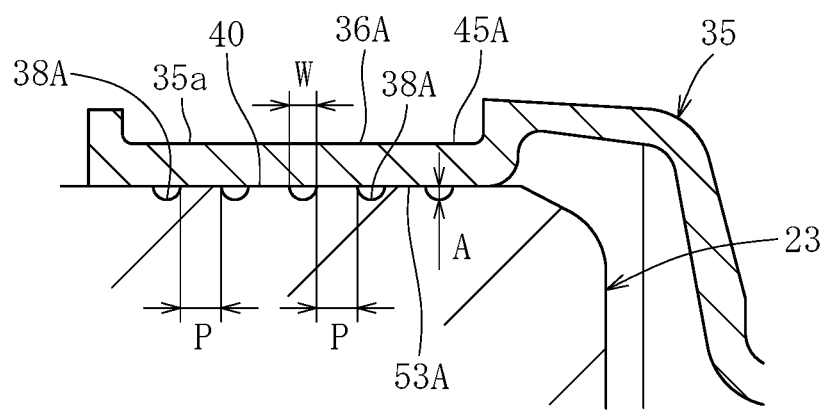
FIG. 22A is an illustration of a mounting method on the outer joint member side through use of the seventh high-frequency induction heating coil and is an enlarged sectional view for illustrating a non-joined state of the boot end portion and the outer joint member.
Figure 22B:
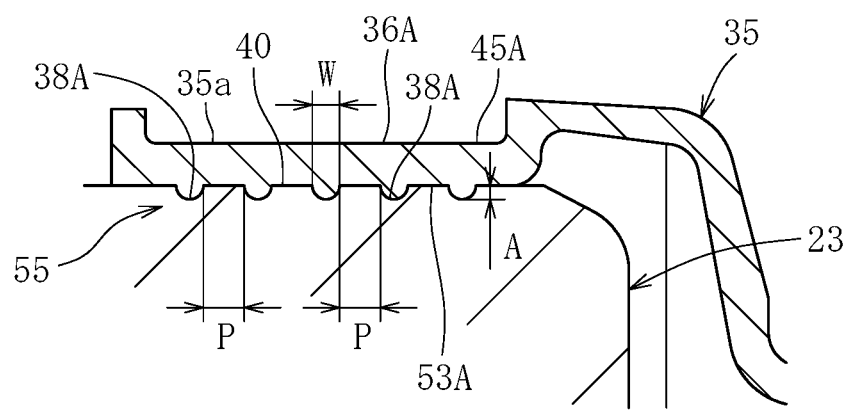
FIG. 22B is an illustration of the mounting method on the outer joint member side through use of the seventh high-frequency induction heating coil and is an enlarged sectional view for illustrating a joined state of the boot end portion and the outer joint member.

Further, as illustrated in FIG. 21, an inner diameter dimension of a radially inner surface 50Ba of the high-frequency induction heating coil 50B is set larger than an outer diameter dimension of the boot end portion 35b which is fitted over the receiving surface 41 of the shaft 30. As illustrated in FIG. 22A and FIG. 22B, the radially outer surface 45B of the boot end portion 35b has a circumferential recessed groove 36B, and a diameter dimension of a bottom surface of the circumferential recessed groove 36B corresponds to an outer diameter dimension of the boot end portion 35b.

Therefore, as illustrated in FIG. 21, when the inner diameter dimension of the radially inner surface of the high-frequency induction heating coil 50A is DA, and the outer diameter dimension of the radially outer surface of the boot end portion 35a is D1A, DA>D1A is satisfied. When the inner diameter dimension of the radially inner surface of the high-frequency induction heating coil 50B is DB, and the outer diameter dimension of the radially outer surface of the boot end portion 35b is D1B, DB>D1B is satisfied. A difference (DA−D1A) is set to from 1 mm to 10 mm, and a difference (DB−D1B) is set to from 1 mm to 10 mm.

That is, when the difference (DA−D1A) or (DB−D1B) is excessively large, gaps GA and GB between the mating members (outer joint member 23 and shaft 30) and the high-frequency induction heating coils 50A and 50B become excessively larger, with the result that joining performance by the high-frequency induction heating is degraded. In contrast, when the difference is excessively small, as illustrated in FIG. 21, there is a fear in that the high-frequency induction heating coils 50A and 50B cannot be arranged on outer peripheral sides of the boot end portions 35*a* and 35*b* fitted over the receiving surface 40 of the outer joint member 23 (receiving surface 41 of shaft 30). Therefore, it is preferred that the radially inner surface of the high-frequency induction heating coil 50A be set larger than the maximum outer diameter of the boot 35. Further, it is preferred that the radially inner surface of the high-frequency induction heating coil 50A be set larger than the maximum outer diameter of the boot end portion 35*b*.

The high-frequency induction heating coils 50A and 50B are each formed of copper wires or the like having conductivity and may be solid members or hollow members. When the high-frequency induction heating coils 50A and 50B are the hollow members, coolant water can pass therein. When the high-frequency induction heating coils 50A and 50B are solid members, the separate cooling jackets may be provided to the high-frequency induction heating coils 50A and 50B.

Incidentally, as illustrated in FIG. 22A, FIG. 22B, FIG. 23A, and FIG. 23B, the receiving surface 40 of the outer joint member 23 (receiving surface 41 of shaft 30) has a plurality of (five in the illustrated example) slits (recessed grooves) 38A and 38B extending in the circumferential direction. In this case, the slits 38A and 38B each have a semi-arcuate sectional shape. Further, the slits 38A and 38B each have a depth dimension A being set within a range of from 0.1 mm to 1 mm and a width dimension W being set within a range of from 0.3 mm to 1 mm. An arrangement pitch P of the slits 38A and 38B is set within a range of from 1 mm to 10 mm. The slits 38A may be formed in the receiving surface 40 at the time of forging the outer joint member 23, or may be formed by turning. The slits 38B may be formed in the receiving surface 41 of the shaft 30 by turning, or may be formed by rolling. The values of A, W, and P may suitably be set in accordance with influence on strength of a member which is to be mounted, a width of the boot joined portion, and easiness in processing of a part which is to be mounted.

Next, description is made of a boot mounting method using the high-frequency induction heating coils 50 (50A and 50B) illustrated in FIG. 21. First, description is made of the outer joint member 23 side. In this case, as illustrated in FIG. 22A, the one boot end portion 35*a* is fitted over the receiving surface 40 being the boot receiving portion of the outer joint member 23. In this state, the high-frequency induction heating coil 50A is loosely fitted over the outer peripheral side of the boot end portion 35*a* (see FIG. 21). At this time, the gap GA between the radially inner surface of the high-frequency induction heating coil 50A and the radially outer surface of the boot end portion 35*a* is set to about 2 mm.

Figure 23A:
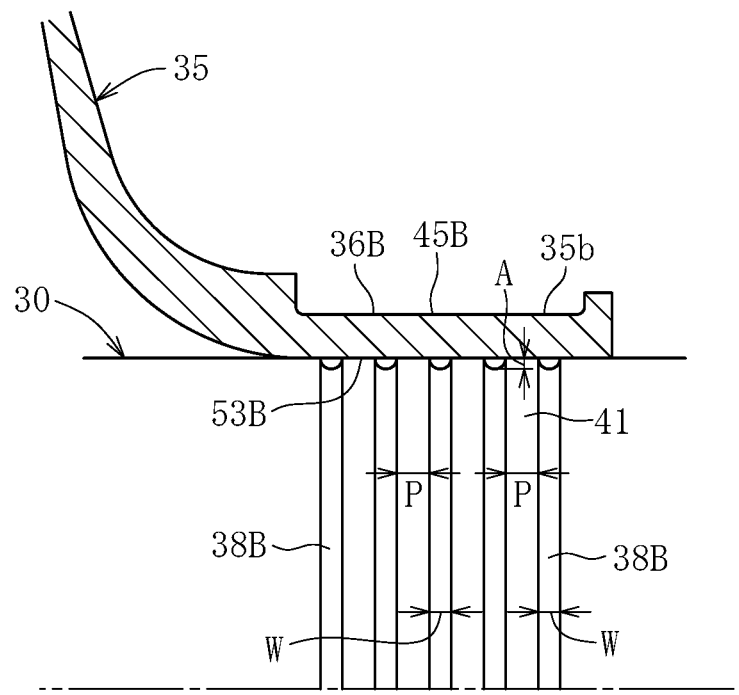
FIG. 23A is an illustration of the mounting method on the shaft side through use of the seventh high-frequency induction heating coil and is an enlarged sectional view for illustrating a non-joined state of the boot end portion and the shaft.
Figure 23B:
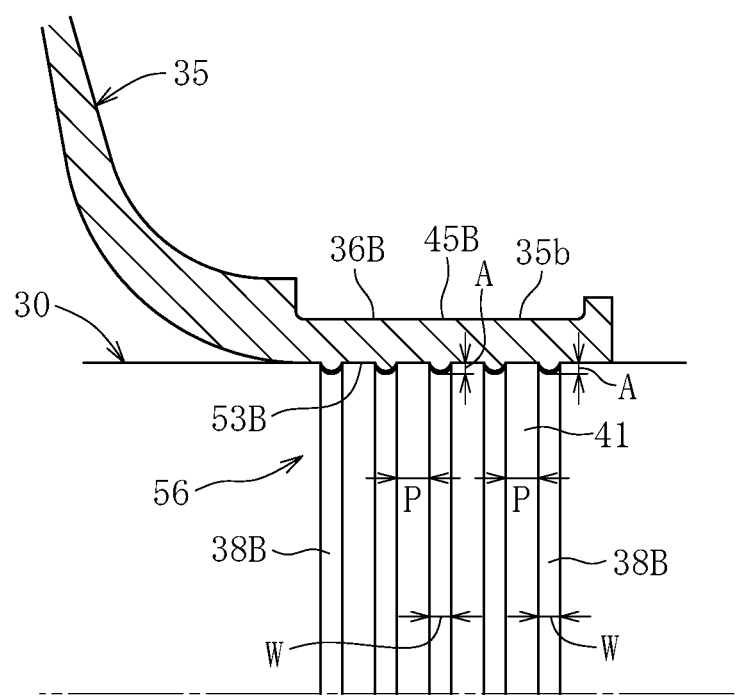
FIG. 23B is an illustration of the mounting method on the shaft side through use of the seventh high-frequency induction heating coil and is an enlarged sectional view for illustrating a joined state of the boot end portion and the shaft.

Further, on the shaft 30 side, as illustrated in FIG. 23A, the other boot end portion 35*b* is fitted over the receiving surface 41 being the boot receiving portion of the shaft 30. In this state, the high-frequency induction heating coil 50B is loosely fitted over the outer peripheral side of the boot end portion 35*b* (see FIG. 21). At this time, the gap GB between the radially inner surface of the high-frequency induction heating coil 50B and the radially outer surface of the boot end portion 35*b* is set to about 2 mm.

Under the state in which the high-frequency induction heating coils 50 (50A and 50B) are set as illustrated in FIG. 21, a high-frequency current is applied to the coils 50A and 50B. At this time, electromagnetic induction causes metal being conductive members (receiving surface 40 of outer joint member 23 and receiving surface 41 of shaft 30) to generate heat through core loss (sum of eddy current loss and hysteresis loss). The heat causes a boundary portion of the boot material (mounting surface 53A of one boot end portion 35*a* and mounting surface 53B of another boot end portion 35*b*) in contact with the metal (receiving surface 40 of outer joint member 23 and receiving surface 41 of shaft 30) to be rapidly heated to a temperature equal to or higher than a decomposition temperature, and then the boundary portion of the boot material is decomposed, thereby generating bubbles. With this action, high-temperature and high-pressure conditions are given to the high-temperature melt in the periphery of the above-mentioned bubbles and to the surface of the metal (receiving surface 40 of outer joint member 23 and receiving surface 41 of shaft 30). As a result, the joined portions 55 and 56 (see FIG. 24) are obtained between the mounting surface 53A of the one end portion 35*a* of the boot 35 and the receiving surface 40 of the outer joint member 23 and between the mounting surface 53B of the other end portion 35*b* of the boot 35 and the receiving surface 41 of the shaft 30.

As a result, the mounting surface 53A of the boot end portion 35*a* and the receiving surface 40 of the outer joint member 23 are integrally joined to each other, and the mounting surface 53B of the boot end portion 35*b* and the receiving surface 41 of the shaft 30 are integrally joined to each other, thereby being capable of mounting and fixing the boot end portion 35*a* to the outer joint member 23 and mounting and fixing the boot end portion 35*b* to the shaft 30.

The slits 38A and 38B are formed in the receiving surfaces 40 and 41 being the radially outer surfaces of the mating members. Therefore, the boot material melted by the high-frequency induction heating enters the slits 38A and 38B. That is, the boot material enters the space formed in the receiving surfaces 40 and 41 and is hardened, thereby achieving the anchor effect (see FIG. 22B and FIG. 23B). The joining strength between the boot end portions 35*a* and 35*b* and the mating members (outer joint member 23 and shaft 30) is increased by the anchor effect, thereby achieving the stable joining strength between the boot end portions 35*a* and 35*b* and the mating members (outer joint member 23 and shaft 30). Therefore, highly accurate sealing performance can be achieved also during rotation under the state in which the constant velocity universal joint takes the operating angle.

Further, through formation of the slits 38A and 38B in the receiving surfaces 40 and 41 being cylindrical surfaces, edge portions are formed. The proximity effect of the electromagnetic induction causes the edge portions to be more likely to raise its temperature, and a desired temperature is likely to be obtained in a wide range, thereby being capable of improving the operability. Further, relative movement between the mating members (outer joint member 23 and shaft 30) and the high-frequency induction heating coils 50A and 50B is not required, thereby being capable of reducing the size and weight of the high-frequency induction heating device which comprises the high-frequency induction heating coils 50A and 50B, thus contributing to reduction in cost.

Figure 26A:
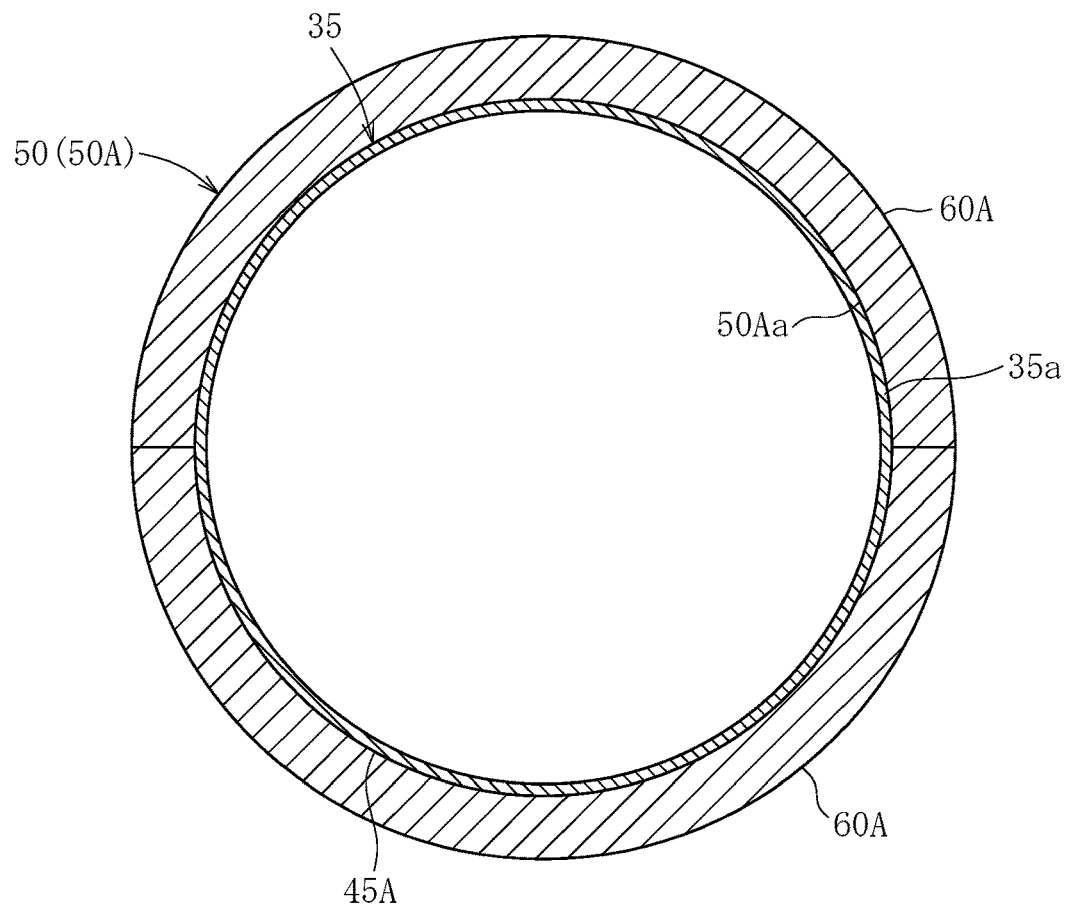
FIG. 26A is a sectional view on the outer joint member side and is an illustration of a relationship between the seventh high-frequency induction heating coil of the separable type and the boot end portion.
Figure 26B:
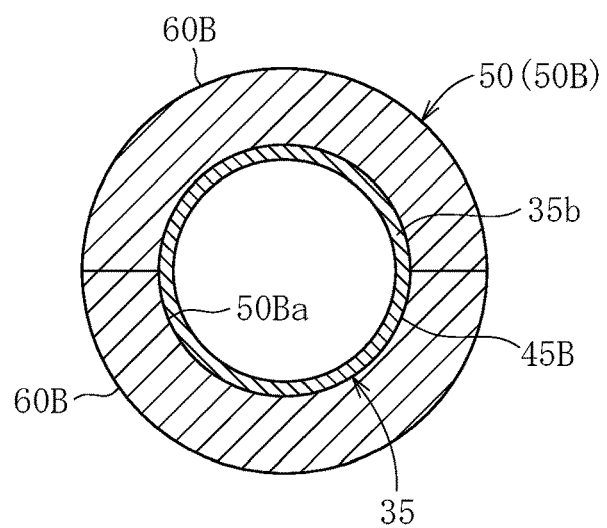
FIG. 26B is a sectional view on the shaft side and is an illustration of the relationship between the seventh high-frequency induction heating coil of the separable type and the boot end portion.

Next, FIG. 25 is an illustration of the seventh high-frequency induction heating coils 50A and 50B. The seventh high-frequency induction heating coils 50A and 50B comprise the dividable ring members comprising the combined pair of arcuate members 60A and 60A and the combined pair of arcuate members 60B and 60B. Thus, with the high-frequency induction heating coils 50A and 50B of the dividable type, the arcuate members 60A and 60A can be mounted (set) to the outer joint member 23 from the radially outer direction, and the arcuate members 60B and 60B can be mounted (set) to the shaft 30 from the radially outer direction. At this time, as illustrated in FIG. 26A and FIG. 26B, the radially inner surfaces 50Aa and 50Ba of the high-frequency induction heating coils 50A and 50B are brought into contact with the non-mounting surfaces 45A and 45B being the radially outer surfaces of the boot end portions 35a and 35b at both the end portions of the boot 35.

Under the state in which the high-frequency induction heating coils 50 (50A and 50B) of the dividable type are set as illustrated in FIG. 25, when a high-frequency current is applied to the coils 50A and 50B, as described above, the mounting surface 53A of the boot end portion 35a (see FIG. 24) and the receiving surface 40 of the outer joint member 23 (see FIG. 24) are integrally joined to each other, and the mounting surface 53B of the boot end portion 35b (see FIG. 24) and the receiving surface 41 of the shaft 30 (see FIG. 24) are integrally joined to each other, thereby being capable of mounting and fixing the boot end portion 35a to the outer joint member 23, and mounting and fixing the boot end portion 35b to the shaft 30.

Figure 24:
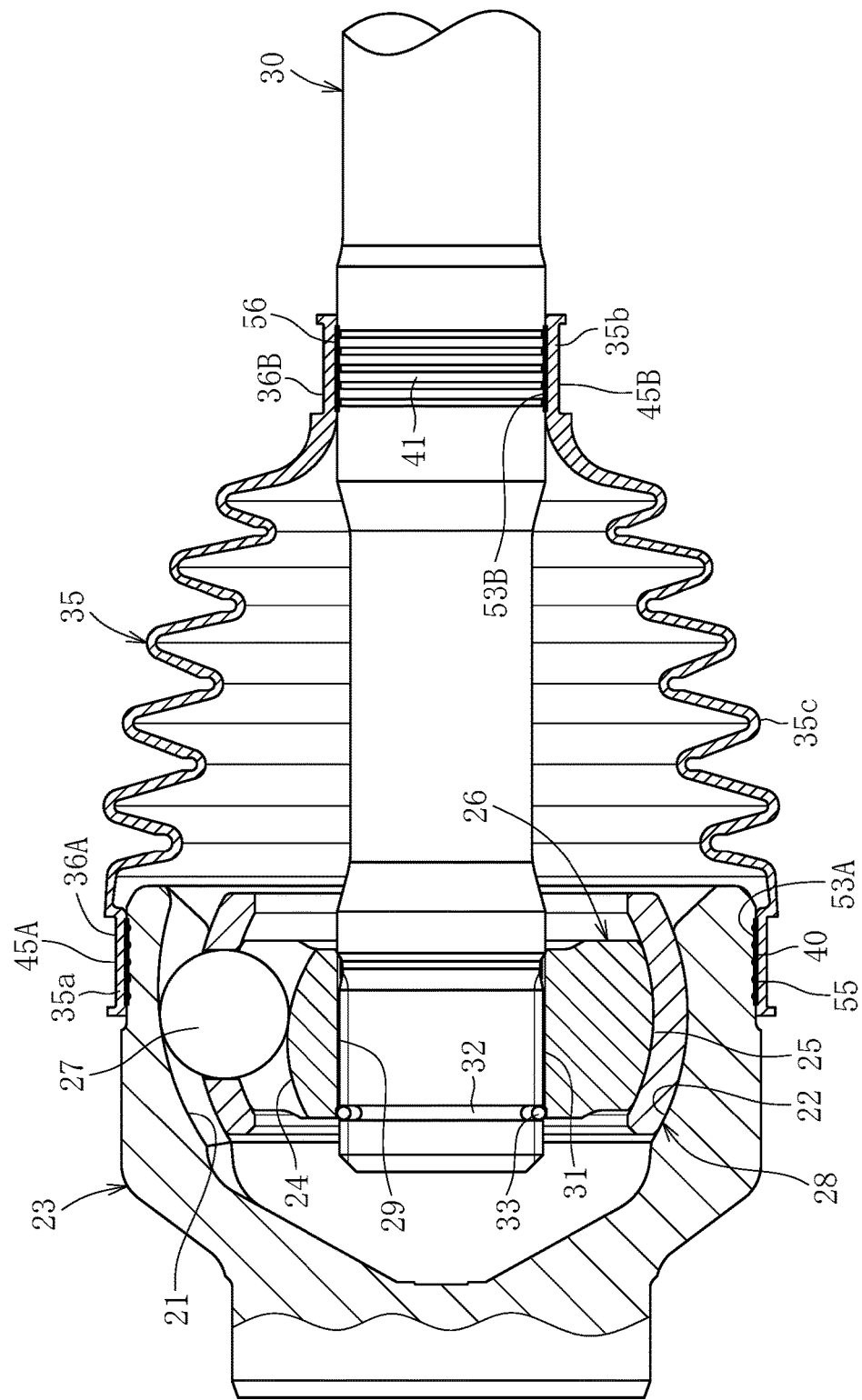
FIG. 24 is a sectional view for illustrating a state after the boot is mounted to the second constant velocity universal joint.

Also in the constant velocity universal joint illustrated in FIG. 25, similarly to FIG. 24, the slits 38A and 38B are formed in the receiving surface 40 of the outer joint member 23 and the receiving surface 41 of the shaft 30. Therefore, even with the high-frequency induction heating coils 50A and 50B of the separable type illustrated in FIG. 25, the action and effect which are similar to those of the mounting method using the high-frequency induction heating coils 50A and 50B of the non-separable type illustrated in FIG. 21 can be achieved.

Further, as illustrated in FIG. 25, when the high-frequency induction heating coils 50A and 50B of the separable type are used, the boot end portions 35a and 35b are present (interposed) between the high-frequency induction heating coils 50A and 50B and the heated objects (mating members). The boot material is resin and is a non-conductive material. Therefore, even when the high-frequency induction heating coils 50A and 50B and the boot end portions 35a and 35b are brought into contact with each other, the high-frequency induction heating coils 50A and 50B are prevented from being broken. Further, the thickness of the boot end portions 35a and 35b is generally constant. Therefore, when the high-frequency induction heating coils 50A and 50B are brought into contact with the radially outer portions (non-adhering surfaces) of the mounting surfaces of the boot end portions 35a and 35b, the gaps formed between the mating members being the heated objects and the high-frequency induction heating coils 50A and 50B can be maintained accurately in the circumferential direction.

Specifically, the gaps formed between the mating members (outer joint member 23 and shaft 30) being the heated objects and the high-frequency induction heating coils 50A and 50B can be maintained accurately in the circumferential direction. Therefore, the adhesive strength (joining strength) in the circumferential direction is uniform, thereby achieving the stable joining strength. Further, relative movement between the mating members (outer joint member 23 and shaft 30) and the high-frequency induction heating coils 50A and 50B is not required, thereby being capable of reducing the size and weight of the high-frequency induction heating device which comprises the high-frequency induction heating coils 50A and 50B, thus contributing to reduction in cost.

Incidentally, it is preferred that the mounting surfaces 53A and 53B of the boot end portions 35a and 35b and the receiving surfaces 40 and 41 of the mating members (outer joint member 23 and shaft 30) have an interference corresponding to a diameter ratio of from 0.995 to 0.98. When the interference is equal to or more than 0.995, a microscopic contact is poor between the metal (outer joint member 23 and shaft 30) and the boot material. When the interference is larger than 0.98, the press-fit resistance of the boot 35 is large, with the result that there is a fear in that assembly is hindered.

When the high-frequency induction heating coils 50A and 50B of the separable type are used as illustrated in FIG. 25, it is preferred that the contact between the radially inner surfaces 50Aa and 50Ba and the radially outer surfaces 45A and 45B being the non-mounting surfaces of the boot end portions 35a and 35b have an interference (see FIG. 6). Even a small interference in the boot 35 may stabilize the gap amount of the joined portions in the circumferential direction. Further, when the interference is excessively large, the high-frequency induction heating coils 50A and 50B cannot be fully closed, with the result that the function cannot be achieved, that is, the high-frequency induction heating coils 50A and 50B cannot be constructed. Therefore, in this case, it is preferred that the interference be from 0.05 mm to 0.3 mm.

Figure 27A:
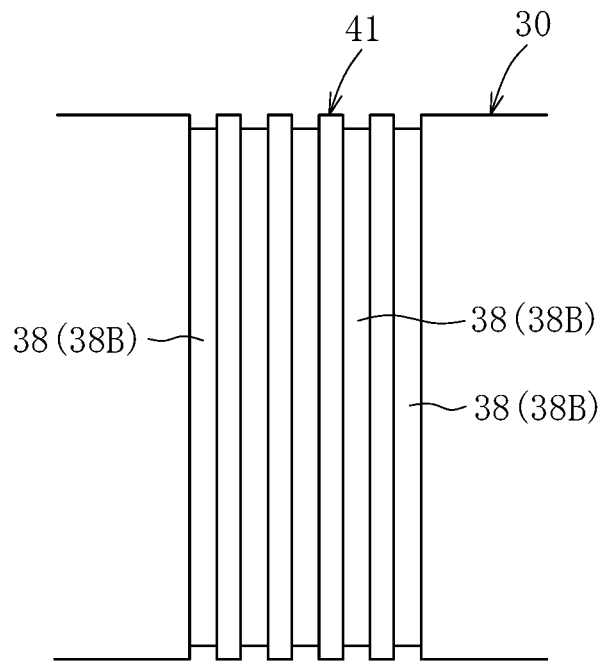
FIG. 27A is an illustration of a receiving surface of the shaft of the second constant velocity universal joint and is a side view of the receiving surface having a slit which has a start end and a terminal end matching with each other.
Figure 27B:
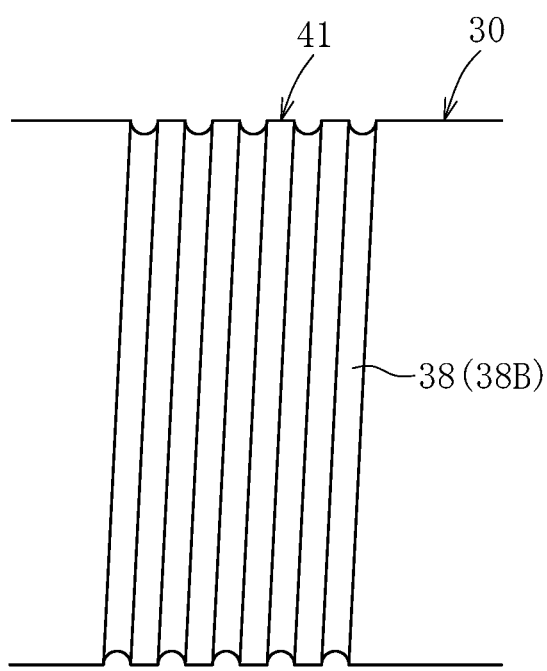
FIG. 27B is an illustration of the receiving surface of the shaft of the second constant velocity universal joint and is a side view of the receiving surface having the slit which has a start end and a terminal end unmatching with each other.
Figure 28:
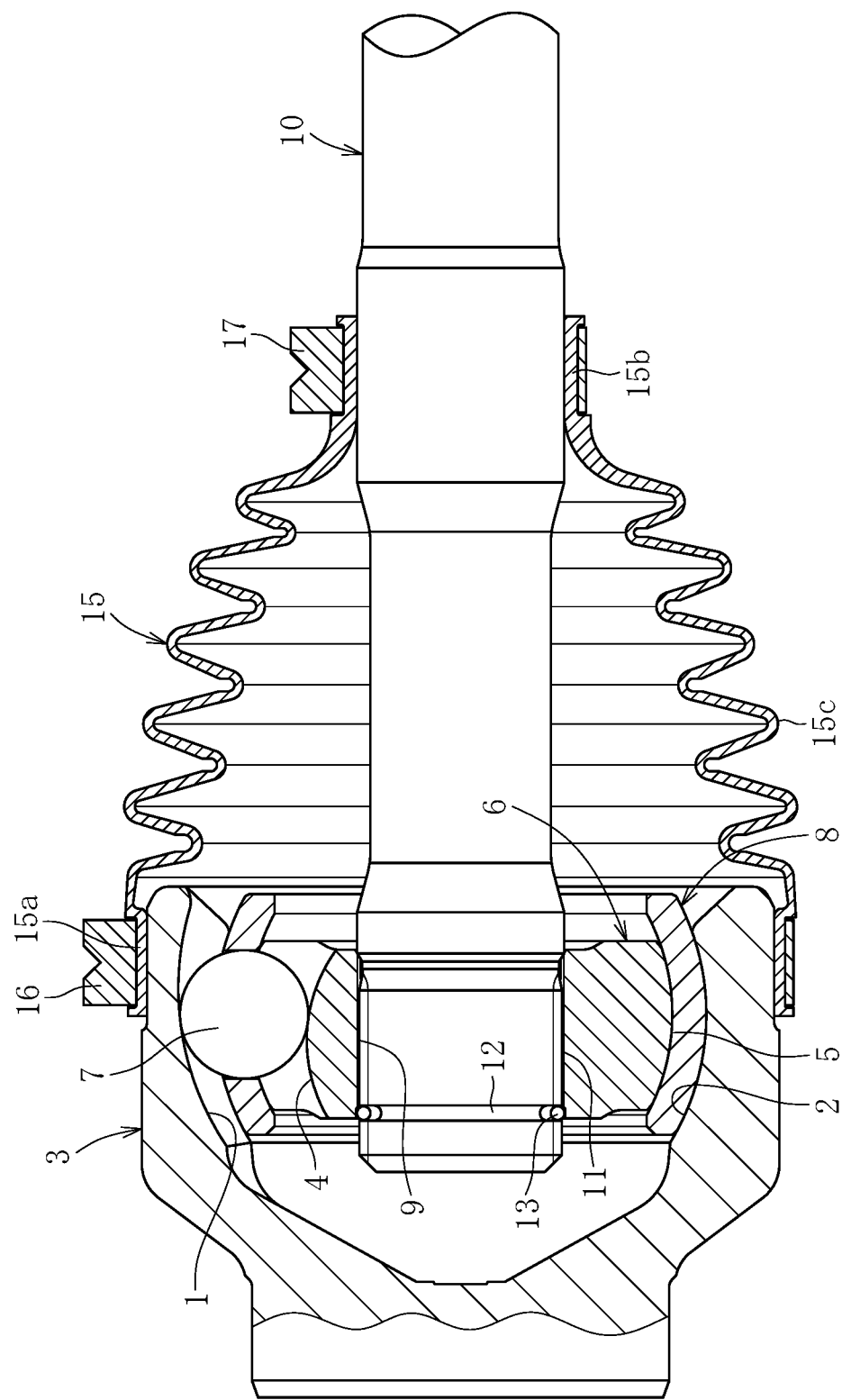
FIG. 28 is a sectional view for illustrating the constant velocity universal joint after the boot is mounted through use of the boot bands.

FIG. 27 are illustrations of modification examples of the slits 38. In FIG. 27A, each slit 38 has a rectangular sectional shape. That is, the slits 38 illustrated in FIG. 21 and FIG. 27A each have a start end and a terminal end matching with each other and are each formed of a circumferential recessed groove. In contrast, the slits illustrated in FIG. 27B are each a spiral groove having a start end and a terminal end different from each other.

Even with the slits illustrated in FIG. 27A and FIG. 27B, the action and effect similar to those of the slits 38A and 38B illustrated in FIG. 22 and FIG. 23 can be achieved. FIG. 27A and FIG. 27B are illustrations of the receiving surface 41 of the shaft 30. However, the slits 38 having such a shape may be formed in the receiving surface 40 of the outer joint member 23.

It is preferred that the boot material be thermoplastic polyester-based elastomer. The thermoplastic polyester-based elastomer is excellent in mechanical strength, moldability, and elasticity, and hence is preferred as a material providing functions such as bending resistance required for the boot. Further, the thermoplastic polyester-based elastomer is less liable to be thermally deformed and has high heat-resistant temperature. Therefore, when this material is applied to the boot which is exposed to high temperature such as during an operation of the constant velocity universal joint, degradation of the durability of the boot due to high temperature can be prevented. In particular, the decomposition temperature of the thermoplastic polyester-based elastomer is from about 400° C. to about 500° C., which is a temperature range being likely to be obtained through the electromagnetic induction heating. Therefore, the thermoplastic polyester-based elastomer is most suitable for use as the boot material in the boot mounting method.

In the above, description is made of the embodiments of the present invention. However, the present invention is not limited to the embodiments described above, and various modifications can be made. According to the above-mentioned embodiments, the high-frequency induction heating is used on both the outer joint member side and the shaft side without use of the boot band. However, any one of the outer joint member side and the shaft side may be subjected to the known mounting and fixing method using the boot band.

Further, the boot end portions 35a and 35b and the high-frequency induction heating coils 50A and 50B may be brought into contact with each other or may be prevented from being brought into contact with each other. However, it is preferred that the gap between the heated object (mating member) and the coil be uniform over an entire periphery in the circumferential direction. Therefore, it is preferred that the boot end portions 35a and 35b and the high-frequency induction heating coils 50A and 50B be brought into contact with each other As a process of mounting the boot end portions 35a and 35b, both the boot end portions 35a and 35b may be simultaneously mounted. Alternatively, a process of mounting one of the boot end portions 35a and 35b may be performed first and after the process, a process of mounting another of the boot end portions 35a and 35b may be performed.

A thickness dimension of the heat-insulating material 38 may suitably be set. However, it is necessary to set the thickness dimension so as to prevent insufficient heating of the mating member due to an excessively large gap between the mating member being the heated object and the high-frequency induction heating coils 50A and 50B.

When the start end and the terminal end of each slit formed in the receiving surface match with each other, the number of slits and arrangement pitches of the slits may suitably be set. For example, unequal pitches may be set. Further, even in the case of the spiral groove illustrated in FIG. 27(b), the number of turns may suitably be set. Further, the sectional shape of each slit is not limited to the semi-arcuate shape or the rectangular shape, and may be a triangular shape, a semi-polygonal shape, a semi-oval shape, or the like. However, these slits also need to be formed so as to allow entry and hardening of the boot material, achieve the anchor effect, and be likely to obtain a desired temperature in a wide range with the proximity effect of the induction heating.

Example 1

The interference between the boot end portion and the shaft was changed, and the ease of mounting of the boot and the joining strength for each interference were studied. The results are shown in the following Table 1 and Table 2. Table 1 and Table 2 are record tables with regard to an interference between an inner diameter (diameter) of the boot end portion and an outer diameter (diameter) of the receiving surface of the mating member. In Table 1, connection between the boot end portion (mounting portion) 35b and the shaft 30 is shown, in a case in which an inner diameter dimension of the boot end portion (mounting portion) 35b is 22 mm (diameter). In Table 2, connection between the boot end portion (mounting portion) 35a and the outer joint member (outer ring) 23 is shown, in a case in which an inner diameter dimension of the boot end portion (mounting portion) 35a is 70 mm (diameter). In Table 1 and Table 2, the comprehensive evaluation of "excellent" is denoted by ⊚. The comprehensive evaluation of "good" is denoted by ◉. The comprehensive evaluation of "acceptable" is denoted by Δ. The comprehensive evaluation of "not acceptable" is denoted by x.

TABLE 1

| Inner Diameter of Boot | φ22 | | | | |
|---|---|---|---|---|---|
| Shaft Diameter | φ22 | φ22.1 | φ22.2 | φ22.3 | φ22.4 |
| Diameter Ratio between Mounting Surface of Boot End Portion and Receiving Surface of Mating Member | 1 | 0.995 | 0.991 | 0.987 | 0.982 |
| Interference between Boot and Shaft | 0 mm | 0.1 mm | 0.2 mm | 0.3 mm | 0.4 mm |

TABLE 1-continued

| Ease of Mounting of Boot (Ease of Fitting to Shaft) | ⊚ | ○ | Δ to ○ | Δ | Δ |
|---|---|---|---|---|---|
| Joining Strength by Close Contact | X | Δ | ○ | ⊚ | ⊚ |
| Comprehensive Evaluation | X | Δ to ○ | ○ | Δ to ○ | Δ |

TABLE 2

| Inner Diameter of Boot | | φ70 | | | |
|---|---|---|---|---|---|
| Outer Ring Diameter | φ70 | φ70.5 | φ71 | φ71.4 | φ71.7 |
| Diameter Ratio between Mounting Surface of Boot End Portion and Receiving Surface of Mating Member | 1 | 0.993 | 0.986 | 0.980 | 0.976 |
| Interference between Boot and Outer Ring | 0 mm | 0.5 mm | 1.0 mm | 1.4 mm | 1.7 mm |
| Ease of Mounting of Boot (Ease of Fitting to Shaft) | ⊚ | ⊚ | ○ | Δ to ○ | Δ to X |
| Joining Strength by Close Contact | X | Δ | ○ | ⊚ | ⊚ |
| Comprehensive Evaluation | X | Δ to ○ | ○ | ○ | X |

As can be understood from the comprehensive evaluations, it is preferred that the inner diameter of the mounting surface of the boot end portion and the outer diameter of the receiving surface of the mating member have an interference corresponding to the diameter ratio of from 0.995 to 0.98. That is, the comprehensive evaluations of Δ and ○ are given in this range.

Example 2

A grease leakage test was conducted for the boot having the boot end portion mounted and fixed to the shaft through use of coils having different shapes of the mating surface. Results thereof are shown in the following Table 3. For this test, the fixed type constant velocity universal joint illustrated in FIG. 5 was used, and a swing angle of from 25 degrees to 40 degrees and the rotation speed of 500 rpm were set.

TABLE 3

| | Straight | Labyrinth 1 | Labyrinth 2 |
|---|---|---|---|
| Coil Mating Surface | | | |
| Grease Leakage Test | 50 hours | 70 hours | 85 hours |

According to the results, the straight mating surface having no stepped structure caused leakage after 50 hours. The labyrinth 1 (stepped structure illustrated in FIG. 7) did not cause leakage after operation for 70 hours. The labyrinth 2 (stepped structure illustrated in FIG. 12) did not cause leakage after operation for 85 hours.

INDUSTRIAL APPLICABILITY

The fixed type constant velocity universal joint is not limited to the illustrated example, and may be a fixed type constant velocity universal joint of an undercut-free type, or a plunging type constant velocity universal joint of a double-offset type, cross-groove type, or a tripod type.

REFERENCE SIGNS LIST 23 outer joint member
26 inner joint member
30 shaft
35 boot
35a boot end portion (mounting portion)
35b boot end portion (mounting portion)
35c bellows portion (bent portion)
38, 38A, 38B slit
40, 41 receiving surface
45A, 45B radially outer surface
46, 46A, 46B heat-insulating material
46Aa, 46Ba radially outer surface
48A, 48B heat-insulating material
48Aa radially outer surface
48Ab radially inner surface
49A, 49A, 49B, 49B semi-arcuate member
50, 50A, 50B high-frequency induction heating coil
50Aa, 50Bb radially inner surface
51A, 51B tapered surface
52A, 52B tapered surface
53A, 53B mounting surface
60A, 60B arcuate member
65, 65 mating surface
66, 69 protruding portion
67, 68 recessed portion
M stepped structure

The invention claimed is:

1. A boot mounting method for a constant velocity universal joint in which a boot end portion is mounted and fixed to a mating member made of metal, the boot mounting method comprising:
fitting the boot end portion over a receiving surface being a radially outer surface of the mating member;
fitting a high-frequency induction heating coil having a ring shape over the boot end portion; and
heating only a top portion of the receiving surface of the mating member by high-frequency induction through application of a high-frequency current to the high-frequency induction heating coil so that a mounting surface being a radially inner surface of the boot end portion and the receiving surface being the radially outer surface of the mating member are integrally joined to each other,
wherein the high-frequency induction heating coil comprises a dividable ring member comprising two arcuate members combined with each other, and
wherein a radially inner surface of the high-frequency induction heating coil and a radially outer surface being a non-mounting surface of the boot end portion have an interference of from 0.05 mm to 0.3 mm.

2. A boot mounting method for a constant velocity universal joint in which a boot end portion is mounted and fixed to a mating member made of metal, the boot mounting method comprising:
fitting the boot end portion over a receiving surface being a radially outer surface of the mating member;
fitting a high-frequency induction heating coil having a ring shape over the boot end portion; and
heating only a top portion of the receiving surface of the mating member by high-frequency induction through application of a high-frequency current to the high-frequency induction heating coil so that a mounting surface being a radially inner surface of the boot end portion and the receiving surface being the radially outer surface of the mating member are integrally joined to each other,
wherein an inner diameter of the mounting surface of the boot end portion and an outer diameter of the receiving surface of the mating member have an interference corresponding to a diameter ratio of from 0.995 to 0.98.

3. A boot mounting method for a constant velocity universal joint in which a boot end portion is mounted and fixed to a mating member made of metal, the boot mounting method comprising:
fitting the boot end portion over a receiving surface being a radially outer surface of the mating member;
fitting a high-frequency induction heating coil having a ring shape over the boot end portion; and
heating only a top portion of the receiving surface of the mating member by high-frequency induction through application of a high-frequency current to the high-frequency induction heating coil so that a mounting surface being a radially inner surface of the boot end portion and the receiving surface being the radially outer surface of the mating member are integrally joined to each other,
wherein the high-frequency induction heating coil comprises a non-dividable ring member, and
wherein a radially inner surface of the high-frequency induction heating coil and a radially outer surface being a non-mounting surface of the boot end portion have tapered surfaces reduced in diameter from a boot bellows side toward a boot end portion side.

4. A boot mounting method for a constant velocity universal joint in which a boot end portion is mounted and fixed to a mating member made of metal, the boot mounting method comprising:
fitting the boot end portion over a receiving surface being a radially outer surface of the mating member;
fitting a high-frequency induction heating coil having a ring shape over the boot end portion; and
heating only a top portion of the receiving surface of the mating member by high-frequency induction through application of a high-frequency current to the high-frequency induction heating coil so that a mounting surface being a radially inner surface of the boot end portion and the receiving surface being the radially outer surface of the mating member are integrally joined to each other,
wherein the high-frequency induction heating coil comprises a non-dividable ring member,
wherein a radially inner surface of the high-frequency induction heating coil and a radially outer surface being a non-mounting surface of the boot end portion have tapered surfaces reduced in diameter from a boot bellows side toward a boot end portion side, and
wherein the tapered surfaces have a taper angle of from 5° to 30°.

5. The boot mounting method according to claim 1, wherein the receiving surface being the radially outer surface of the mating member has a slit formed therein.

6. The boot mounting method according to claim 5, wherein the slit formed in the receiving surface of the mating member has a depth set within a range of from 0.1 mm to 1 mm.

7. The boot mounting method according to claim 1, wherein a material of the boot end portion is thermoplastic polyester-based elastomer.

8. The boot mounting method according to claim 2,
wherein the receiving surface being the radially outer surface of the mating member has a slit formed therein.

9. The boot mounting method according to claim 8, wherein the slit formed in the receiving surface of the mating member has a depth set within a range of from 0.1 mm to 1 mm.

10. The boot mounting method according to claim 2, wherein a material of the boot end portion is thermoplastic polyester-based elastomer.

11. The boot mounting method according to claim 3,
wherein the receiving surface being the radially outer surface of the mating member has a slit formed therein.

12. The boot mounting method according to claim 11, wherein the slit formed in the receiving surface of the mating member has a depth set within a range of from 0.1 mm to 1 mm.

13. The boot mounting method according to claim 3, wherein a material of the boot end portion is thermoplastic polyester-based elastomer.

14. The boot mounting method according to claim 4,
wherein the receiving surface being the radially outer surface of the mating member has a slit formed therein.

15. The boot mounting method according to claim 14, wherein the slit formed in the receiving surface of the mating member has a depth set within a range of from 0.1 mm to 1 mm.

16. The boot mounting method according to claim 4, wherein a material of the boot end portion is thermoplastic polyester-based elastomer.

* * * * *